US010055829B2

(12) United States Patent
Park et al.

(10) Patent No.: US 10,055,829 B2
(45) Date of Patent: Aug. 21, 2018

(54) METHOD OF MEASURING THICKNESS, METHOD OF PROCESSING IMAGE AND ELECTRONIC SYSTEM PERFORMING THE SAME

(71) Applicant: Samsung Electronics Co., Ltd., Suwon-si, Gyeonggi-do (KR)

(72) Inventors: Min-Chul Park, Hwaseong-si (KR); Je-Hyun Lee, Suwon-si (KR); Jeong-Hoon Ko, Seoul (KR); Young-Gu Kim, Hwaseong-si (KR); Keun-Ho Lee, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 144 days.

(21) Appl. No.: 15/252,613

(22) Filed: Aug. 31, 2016

(65) Prior Publication Data
US 2017/0109896 A1     Apr. 20, 2017

(30) Foreign Application Priority Data

Oct. 15, 2015   (KR) .................. 10-2015-0144096

(51) Int. Cl.
*G06T 7/00*     (2017.01)
*G06T 7/62*     (2017.01)
(Continued)

(52) U.S. Cl.
CPC ............ *G06T 7/0004* (2013.01); *G06T 5/002* (2013.01); *G06T 7/12* (2017.01); *G06T 7/62* (2017.01);
(Continued)

(58) Field of Classification Search
CPC ......... G06T 5/002; G06T 7/0004; G06T 7/12; G06T 7/62; G06T 2207/30148
See application file for complete search history.

(56) References Cited

U.S. PATENT DOCUMENTS

| 5,239,591 A | 8/1993 | Ranganath |
| 7,542,622 B1 | 6/2009 | Angelini et al. |
| (Continued) | | |

FOREIGN PATENT DOCUMENTS

| JP | 2014-132433 A | 7/2014 |
| JP | 2015-57682 | 3/2015 |
| (Continued) | | |

*Primary Examiner* — Yubin Hung
(74) *Attorney, Agent, or Firm* — Harness, Dickey & Pierce, PLC

(57) ABSTRACT

A thickness of a first layer in a structure may be measured based on an original image of the structure. A first boundary of the first layer may be identified in the original image. A second boundary that is substantially indistinguishable in the original image may be identified based on converting the original image into a first image based on the first boundary and generating a second image based on filtering the first image. The first image may be generated based on adjusting partial image portions of the original image to align the representation of the first boundary with an axis line, such that the first image includes a representation of the first boundary that extends substantially in parallel with the axis line. The second boundary may be identified from the second image, and the thickness of the layer may be determined based on the identified first and second boundaries.

20 Claims, 17 Drawing Sheets

(51) Int. Cl.
G06T 5/00 (2006.01)
G06T 7/12 (2017.01)

(52) U.S. Cl.
CPC ............... *G06T 2207/10061* (2013.01); *G06T 2207/20024* (2013.01); *G06T 2207/20048* (2013.01); *G06T 2207/20216* (2013.01); *G06T 2207/30148* (2013.01)

(56) References Cited

U.S. PATENT DOCUMENTS

| | | | |
|---|---|---|---|
| 7,826,642 B2 * | 11/2010 | Cherkassky | G01N 21/8983 348/88 |
| 9,064,188 B2 | 6/2015 | Kavanau et al. | |
| 9,320,423 B2 * | 4/2016 | Nakano | A61B 3/0025 |
| 2009/0169087 A1 * | 7/2009 | Doi | G06T 7/0012 382/132 |
| 2009/0257498 A1 | 10/2009 | Kurata | |
| 2010/0165134 A1 | 7/2010 | Dowski, Jr. et al. | |
| 2012/0063656 A1 * | 3/2012 | Jao | G06T 3/0068 382/128 |
| 2012/0296212 A1 * | 11/2012 | Hamada | A61B 8/0858 600/443 |
| 2013/0163837 A1 | 6/2013 | Zabair et al. | |
| 2013/0216121 A1 * | 8/2013 | Sasajima | H01J 37/28 382/145 |
| 2014/0135627 A1 * | 5/2014 | Liang | A61B 5/02007 600/449 |
| 2014/0220713 A1 | 8/2014 | Dowski, Jr. et al. | |
| 2014/0334703 A1 | 11/2014 | Farsiu et al. | |
| 2015/0310613 A1 | 10/2015 | Murakami | |
| 2016/0171709 A1 * | 6/2016 | Kim | G06T 7/11 382/175 |
| 2017/0090715 A1 * | 3/2017 | Lim | G06F 3/04812 |

FOREIGN PATENT DOCUMENTS

KR 10-1475529 2/2009
KR 10-2009-0109504 A 10/2009

* cited by examiner

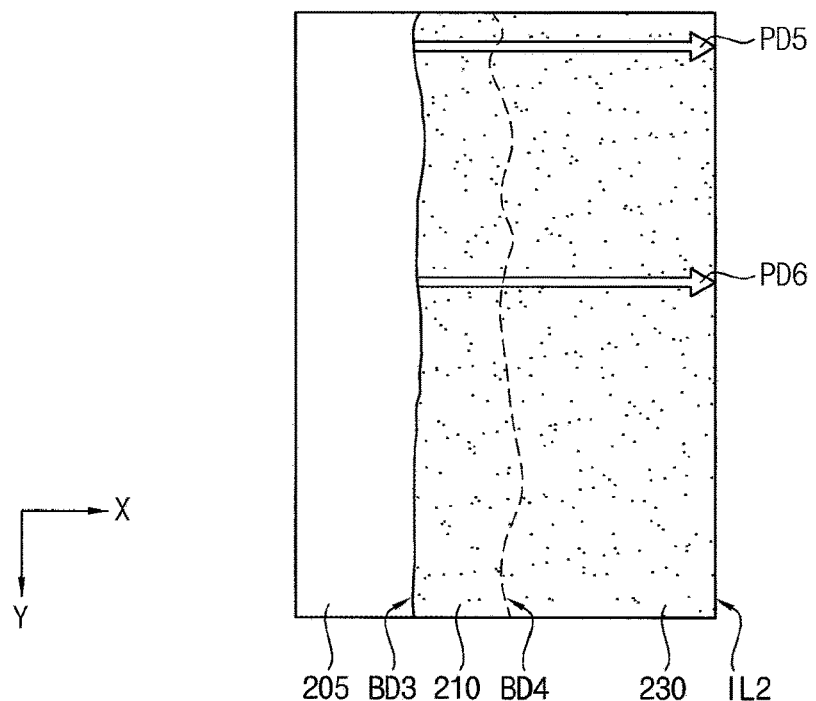
FIG. 16
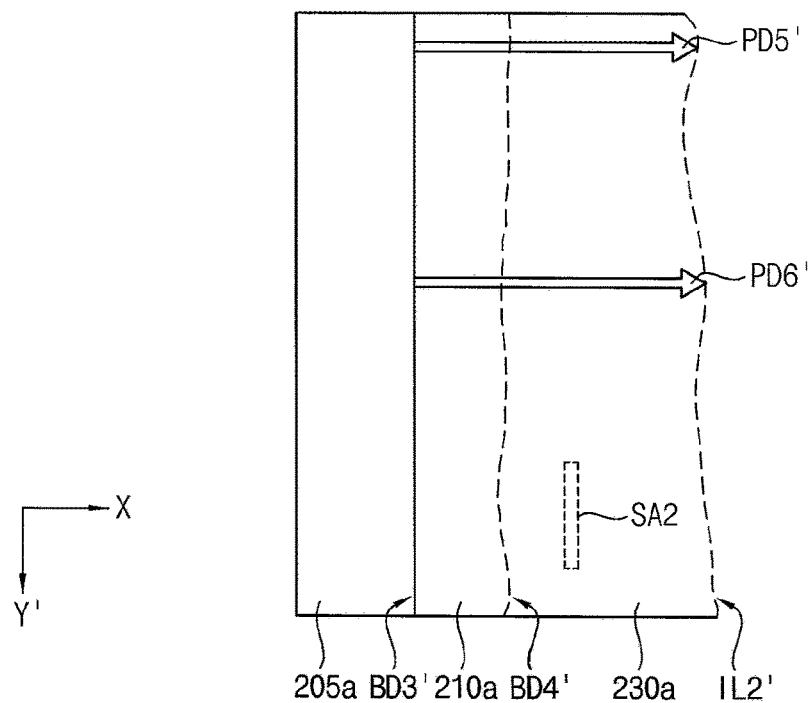

METHOD OF MEASURING THICKNESS, METHOD OF PROCESSING IMAGE AND ELECTRONIC SYSTEM PERFORMING THE SAME

CROSS-REFERENCE TO RELATED APPLICATION

This application claims priority under 35 USC § 119 to Korean Patent Application No. 10-2015-0144096, filed on Oct. 15, 2015 in the Korean Intellectual Property Office (KIPO), the contents of which are herein incorporated by reference in their entirety.

BACKGROUND

1. Technical Field

Example embodiments relate generally to image processing, and more particularly to measuring thicknesses of objects and/or layers based on images, processing the images including the objects and/or layers, and/or electronic systems performing such measuring and/or processing.

2. Description of the Related Art

Semiconductor elements are manufactured based on various semiconductor processes. To determine whether the semiconductor processes have been successfully performed or not, physical dimensions (e.g., a thickness) of film materials or thin film layers in the semiconductor elements are measured during and/or after performing the semiconductor processes. The quality and/or productivity of the semiconductor processes or the semiconductor elements may be improved based on feeding back the test results (e.g., measured thicknesses of the film materials or the thin film layers) to the semiconductor processes. Non-contact, non-destructive apparatuses for measuring a thickness of an object using X-ray, sonic wave or light may be used because such apparatuses do not process, destruct, or convert an object to be measured (e.g., a semiconductor substrate). Research for thickness measurement techniques is being conducted to meet the requirement for being more accurate and being capable of measuring more complicated patterns.

SUMMARY

Accordingly, some example embodiments substantially obviate one or more problems due to limitations and disadvantages of the related art.

At least one example embodiment provides a method of measuring a thickness of an object and/or a layer capable of efficiently and precisely obtaining the thickness based on an image.

At least one example embodiment provides a method of processing an image capable of being used in the method of measuring the thickness.

At least one example embodiment provides an electronic system capable of performing the method of measuring the thickness and/or the method of processing the image.

According to some example embodiments, a method of measuring a thickness may include obtaining an original image of a structure, the structure including a first layer, the first layer including a first boundary and a second boundary, the original image including an image of the structure having the first layer, the second boundary being substantially indistinguishable in the original image. The method may include extracting the first boundary of the first layer in the original image, converting the original image into a first image based on the extracted first boundary, generating a second image, based on filtering the first image, extracting the second boundary of the first layer in the second image, and calculating a thickness of the first layer based on the extracted second boundary in the second image.

Extracting the first boundary of the first layer in the first image may include detecting a plurality of boundary points in the original image based on grayscale value changes in the original image, and determining the first boundary as a line extending through the plurality of boundary points.

Detecting each boundary point in the original image based on grayscale changes in the original image may include determining that a difference between a grayscale value of a given boundary point and a grayscale value of a first point adjacent to the given boundary point is greater than a threshold grayscale value.

Converting the original image into the first image may include identifying a target region in the original image based on the extracted first boundary in the original image, the target region being associated with the structure and the first layer. Converting the original image into the first image may include mapping a plurality of boundary points in the original image into a plurality of axis points in the first image, the plurality of boundary points corresponding to the first boundary in the original image. Converting the original image into the first image may include obtaining the first image by changing arrangements of a plurality of partial images in the target region based on the plurality of axis points such that the plurality of axis points define a line extending substantially in parallel with an axis of the first image.

The plurality of boundary points may be nonlinearly arranged in the original image, the plurality of axis points may be linearly arranged in the first image, and a first linear line including the plurality of axis points is substantially parallel with a first direction, and the plurality of partial images may be arranged in the first image along a second direction crossing the first direction.

The plurality of boundary points may be arranged with a circular shape or an elliptical shape in the original image.

Generating the second image may include dividing the first image into a plurality of subregions and performing an averaging operation on each of the plurality of subregions to generate a plurality of averaged subregions, such that the second image includes the plurality of averaged subregions.

The plurality of axis points may be linearly arranged in the first image, and a first linear line including the plurality of axis points is parallel with a first direction. Each of the plurality of subregions may have a first side extending in the first direction and a second side extending in a second direction that is substantially perpendicular to the first direction. The second side may be shorter than the first side.

The averaging operation may be performed based on a Gaussian filter.

The method may include removing noise from the first image to at least partially generate the second image.

The method may include removing noise from the first image based on a domain transform filter.

The structure may be represented in the original image based on rectangular coordinates. The structure may be represented in the first image and the second image based on polar coordinates.

The structure may be a hole structure. The hole structure may be on a semiconductor substrate. The first layer may be in the hole structure.

The structure may be a fin structure. The fin structure may be on a semiconductor substrate. The first layer may be on the fin structure.

According to some example embodiments, a method of measuring a thickness may include obtaining an original image of a structure, the structure including a plurality of layers, the original image including an image of the structure including a first layer and a second layer, the first layer including a first boundary, the second layer including a second boundary, the second boundary being substantially indistinguishable in the original image. The method may include extracting the first boundary of the first layer in the original image. The method may include converting the original image into a first image based on the extracted first boundary, generating a second image, based on filtering the first image, extracting the second boundary of the second layers in the second image, and calculating thicknesses of the first and second layers based on the extracted first and second boundaries.

According to some example embodiments, a method of processing an image may include obtaining an original image of a structure, the structure including a first layer, the first layer including a first boundary and a second boundary, the original image including an image of the structure having the first layer, the second boundary being substantially indistinguishable in the original image. The method may include extracting the first boundary of the first layer in the original image, converting the original image into a first image based on the extracted first boundary, generating a second image based on filtering the first image, and extracting the second boundary based on processing the second image.

Extracting the first boundary of the first layer may include detecting a plurality of boundary points in the original image based on determining that a difference between a grayscale value of a given boundary point and a grayscale value of a first point adjacent to the given boundary point is greater than a threshold grayscale value, and extracting the first boundary as a line defined by the plurality of boundary points.

Converting the original image into the first image may include identifying a target region in the original image based on the extracted first boundary in the original image, the target region being associated with the structure and the first layer, the target region being a portion of the original image that includes the plurality of boundary points, the target region including a plurality of partial images. Converting the original image into the first image may include obtaining the first image by adjusting relative arrangements of the plurality of partial images in the target region to align the boundary points with an axis extending in a second direction, the second direction being substantially perpendicular to the first direction.

Generating the second image may include dividing the first image into a plurality of subregions, each of the plurality of subregions including a first side extending in the first direction and a second side extending in the second direction, the second side being shorter than the first side. Generating the second image may include performing an averaging operation on pixel values of each of the plurality of subregions to generate a plurality of averaged subregions.

Generating the second image may include at least partially removing noise from the first image.

According to some example embodiments, an electronic system may include an image pickup device configured to receive an original image of a structure, the structure including a first layer, a memory, and a processor. The processor may be interoperable with the memory to extract a first boundary of the first layer in the original image, convert the original image into a first image of the structure based on the extracted first boundary, generate a second image of the structure based on filtering the first image of the structure, and extract a second boundary of the first layer in the second image of the structure.

The processor may be interoperable with the memory to extract the first boundary of the first layer based on detecting a plurality of boundary points in the original image based on grayscale changes in the original image and identifying a line defined by the plurality of boundary points as the first boundary.

Converting the original image into the first image may include identifying a target region in the original image based on the first boundary such that the target region includes the plurality of boundary points, the target region including a plurality of partial images. Converting the original image into the first image may include adjusting relative arrangements of the plurality of partial images to align the plurality of boundary points with an axis line.

Generating the second image may include dividing the first image into a plurality of subregions, and performing an averaging operation on pixel values of each of the plurality of subregions to generate a plurality of averaged subregions.

The processor may be interoperable with the memory to calculate a thickness of the first layer based on the extracted first boundary and the extracted second boundary.

The processor may be interoperable with the memory to calculate a uniformity of the thickness of the first layer.

The image pickup device may include a transmission electron microscope (TEM) configured to capture the original image.

The image pickup device may include a scanning electron microscope (SEM) configured to capture the original image.

According to some example embodiments, a method may include determining a thickness of a first layer of a structure based on processing an original image of the structure, the first layer including a first boundary and a second boundary, the original image including a representation of the first boundary, the second boundary being substantially indistinguishable in the original image. The determining may include segmenting the original image into a plurality of partial images, at least some of the partial images including separate portions of the first boundary representation, adjusting relative arrangements of the plurality of partial images to generate a first image of the structure, the first image including an aligned arrangement of the first boundary representation portions, the aligned arrangement being aligned with an axis of the first image, and filtering the first image to generate a second image of the structure. The method may include extracting the second boundary from the second image. The method may include determining the thickness of the first layer based on a determined distance between the first boundary and the second boundary.

The representation of the first boundary in the original image may be a nonlinear line, and the axis line may extend in a first direction in the first image.

The first boundary may define a circular shape or an elliptical shape in the original image.

Generating the second image may include dividing the first image into a plurality of subregions and performing an averaging operation on each of the plurality of subregions to generate a plurality of averaged subregions, such that the second image includes the plurality of averaged subregions.

BRIEF DESCRIPTION OF THE DRAWINGS

The foregoing and other features of inventive concepts will be apparent from the more particular description of non-limiting embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings:

FIG. 15, FIG. 16 and FIG. 17 are diagrams for describing the method of measuring the thickness according to some example embodiments;

DETAILED DESCRIPTION OF THE EMBODIMENTS

Figure 1:
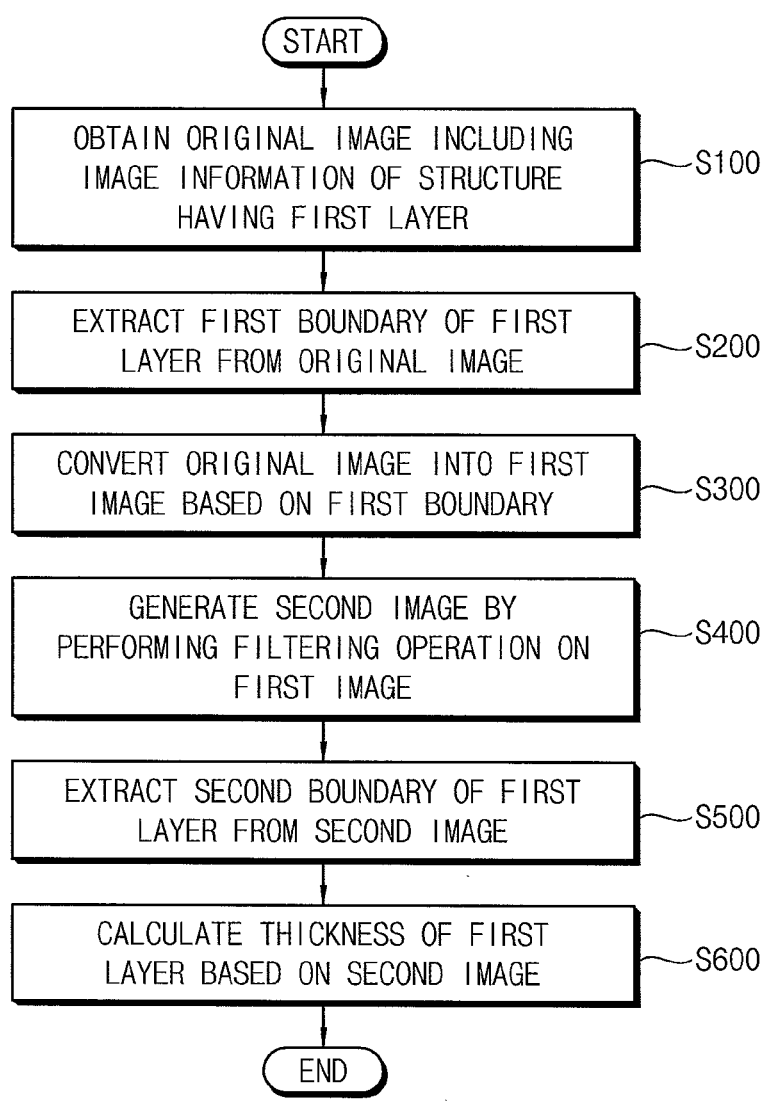
FIG. 1 is a flow chart illustrating a method of measuring a thickness according to some example embodiments.

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference characters and/or numerals in the drawings denote like elements, and thus their description may not be repeated.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

It will be understood that, although the terms "first", "second", etc. may be used herein to describe various elements, components, regions, layers and/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an etched region or an implanted region illustrated as a rectangle may have rounded or curved features. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

FIG. 1 is a flow chart illustrating a method of measuring a thickness according to some example embodiments.

Referring to FIG. 1, in the method of measuring the thickness according to some example embodiments, a thickness of an object or a layer (e.g., a film material, a thin film layer, etc.) may be measured based on an image including the object or the layer which is a subject for the photograph.

In the method of measuring the thickness according to some example embodiments, an original image is obtained (step S100). The original image includes image information of a structure having a first layer. For example, the structure may be any structure that is included in a semiconductor element and/or a semiconductor device. The first layer may be formed in or on the structure by at least one of various processes, e.g., deposition, oxidation, etc., for manufacturing the semiconductor element and/or a semiconductor device. A thickness of the first layer may be obtained based on the method of measuring the thickness according to some example embodiments.

In some example embodiments, as will be described with reference to FIG. 2, the structure may be a hole structure that is included in the semiconductor element and/or the semiconductor device. In some example embodiments, as will be described with reference to FIG. 14, the structure may be a fin structure that is included the semiconductor element and/or the semiconductor device.

In some example embodiments, the original image may be an image that is obtained by a transmission electron microscope (TEM). In some example embodiments, the original image may be an image that is obtained by a scanning electron microscope (SEM). Thus, the original image may be a high-resolution image and may have a very high picture quality.

A first boundary (e.g., one of two boundaries) of the first layer is extracted from the original image (step S200). The first layer may include the first boundary and a second boundary that is opposite to the first boundary. Extracting a first boundary may include identifying, detecting, etc. the first boundary in the first image, such that a configuration of the first boundary relative to a remainder of the first layer is identified. In the original image, it may be easier to detect the first boundary (e.g., one of two boundaries) than to detect the second boundary (e.g., the other of two boundaries) because of characteristics of the image information in the original image, and thus the first boundary may be detected prior to a detection of the second boundary. In some example embodiments, the second boundary may be substantially indistinguishable in the original image, such that the second boundary cannot be extracted from the original image. The step S200 will be explained in detail with reference to FIGS. 3, 4 and 5.

The original image is converted into a first image based on the first boundary (e.g., one of two boundaries) (step S300). As described above, when the first layer is formed by the deposition and/or the oxidation for manufacturing the semiconductor element and/or a semiconductor device, an overall thickness of the first layer may be relatively uniform without great variations or deviations. In the method of measuring the thickness according to some example embodiments, the original image may be rearranged, reconstituted or reconstructed based on the first boundary to establish the first image, and then the thickness of the first layer may be efficiently and precisely measured based on the rearranged, reconstituted or reconstructed image (e.g., the first image). The step S300 will be explained in detail with reference to FIGS. 6, 7 and 8.

A second image is generated by performing a filtering operation on the first image (e.g., filtering the first image) (step S400). As described above, when the original image is obtained by the TEM or the SEM, it may be difficult to detect (e.g., extract) the second boundary in the original image because of an excessively high picture quality of the original image. In the method of measuring the thickness according to some example embodiments, the first image that is generated by rearranging, reconstituting or reconstructing the original image may be filtered, and then the second boundary may be easily detected in the filtered image (e.g., the second image). The step S400 will be explained in detail with reference to FIGS. 9, 10, 11A, 11B, 12 and 13.

The second boundary (e.g., the other of two boundaries) of the first layer is extracted from the second image (step S500), and the thickness of the first layer is calculated based on the second image (step S600). In comparison with an example of measuring the thickness of the first layer based on the original image, the measurement of the thickness of the first layer may be rapidly and precisely performed at the large number of measuring positions with the large number of measured samples when the thickness of the first layer is measured based on the second image. The steps S500 and S600 will be explained in detail with reference to FIG. 12.

Hereinafter, the example embodiments will be explained in detail based on an example where the first layer to be measured is formed by the processes for manufacturing the semiconductor element and/or the semiconductor device. However, the example embodiments may be employed to measure a thickness of any object that is included in various types of elements and/or devices.

Figure 2:
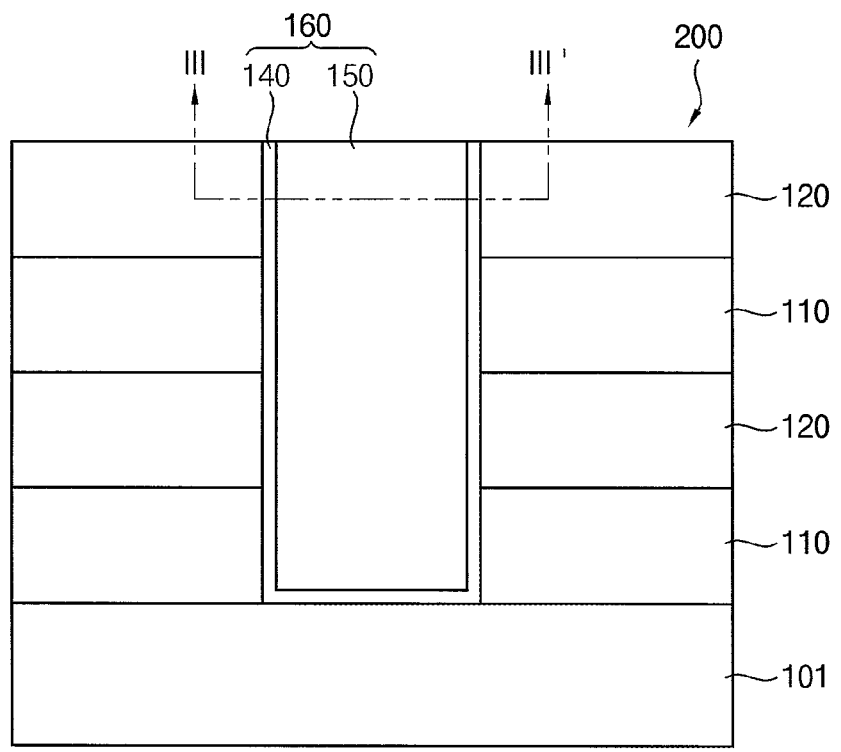
FIG. 2 is a cross-sectional view illustrating an example of a structure having a first layer to be measured based on the method of measuring the thickness according to some example embodiments.

FIG. 2 is a cross-sectional view illustrating an example of a structure having a first layer to be measured based on the method of measuring the thickness according to some example embodiments.

Referring to FIG. 2, a semiconductor element 200 may include a substrate 101, an insulation layer(s) 110, a sacrificial layer(s) 120, a first layer 140 and a filling layer pattern 150. The first layer 140 and the filling layer pattern 150 may form a hole structure 160.

The substrate 101 may include a semiconductor material, for example, silicon and/or germanium. The substrate 101 may be, for example, a bulk semiconductor substrate or a semiconductor layer.

To manufacture the semiconductor element 200 of FIG. 2, the insulation layer(s) 110 and the sacrificial layer(s) 120 may be alternately and repeatedly formed on the substrate 101. A plurality of insulation layers 110 and a plurality of sacrificial layers 120 may be alternately formed on each other at a plurality of levels, respectively. An opening may be formed through the insulation layer(s) 110 and the sacrificial layer(s) 120 to expose a top surface of the substrate 101. The first layer 140 may be formed on a sidewall of the opening and on the exposed top surface of the substrate 101, and the filling layer pattern 150 may be formed on the first layer 140 to fill the remaining portion of the opening. In other words, the first layer 140 may be deposited in the hole structure 160.

In some example embodiments, the insulation layer(s) 110 and the sacrificial layer 120 may be formed, for example, using chemical vapor deposition (CVD), plasma enhanced chemical vapor deposition (PECVD), and/or atomic layer deposition (ALD). The insulation layer 110, which may be formed directly on a top surface of the substrate 101, may be formed, for example, using thermal oxidation. The insulation layer 110 may be formed to include a silicon oxide, for example, silicon dioxide ($SiO_2$), silicon oxycarbide (SiOC), and/or silicon oxyfluoride (SiOF). The sacrificial layer(s) 120 may be formed to include, for example, a material with etch selectivity with respect to the insulation layer 110 (e.g., silicon nitride (SiN) and/or silicon boronitirde (SiBN)).

In some example embodiments, after forming a hard mask (not illustrated) on an uppermost layer (e.g., the layer 120), the insulation layers 110 and the sacrificial layers 120 may be dry etched using the hard mask as an etch mask to form the opening. The opening may extend in a direction substantially perpendicular to the top surface of the substrate 101. In some example embodiments, due to the characteristics of a dry etch process, the opening may be of a width that becomes gradually smaller from a top portion to a bottom portion thereof.

In some example embodiments, the first layer 140 may be formed on the exposed top surface of the substrate 101 and the sidewall of the opening, and the filling layer pattern 150 may be formed on the first layer 140 to fill the remaining portion of the opening. The first layer 140 may be formed to include, for example, doped polysilicon, single crystalline silicon and/or amorphous silicon. The filling layer pattern 150 may be formed to include, for example, an insulating material (e.g., an oxide). For example, the first layer 140 may be cup-shaped and/or of hollow cylindrical-shaped on the sidewall of the opening and the exposed top surface of the substrate 101. The filling layer pattern 150 may be pillar-shaped extending in the direction substantially perpendicular to the top surface of the substrate 101.

In some example embodiments, the semiconductor element of FIG. 2 may be a vertical memory device, and then the hole structure 160 may be a channel hole structure in the vertical memory device.

Although not illustrated in FIG. 2, the semiconductor element 200 may be an image sensor, and then the structure having the first layer may be a vertical gate structure (e.g., a vertical transfer gate) in the image sensor.

Figure 3:
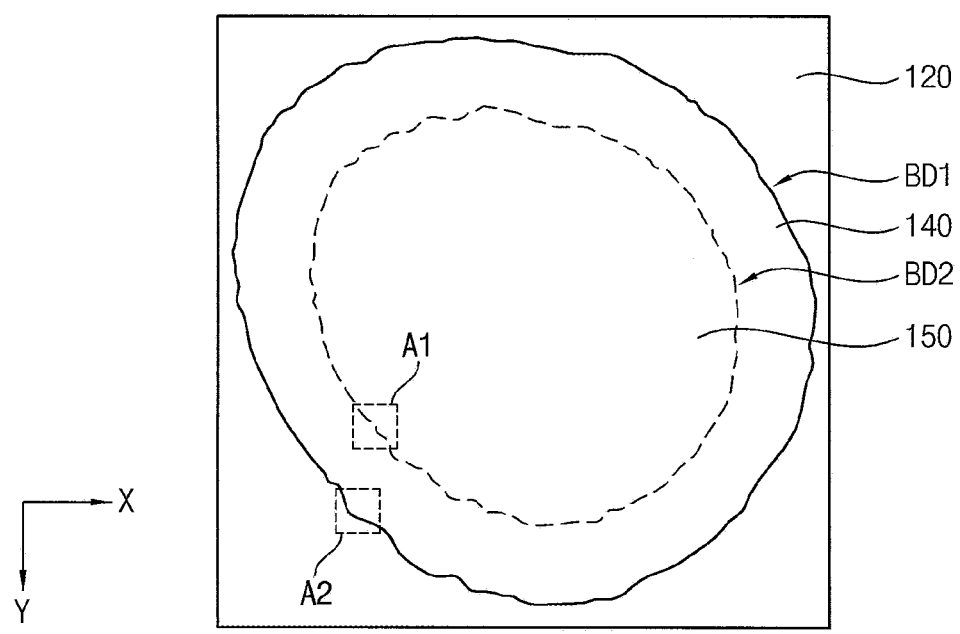
FIG. 3, FIG. 4A and FIG. 4B are diagrams for describing an original image used in the method of measuring the thickness according to some example embodiments.
Figure 4A:
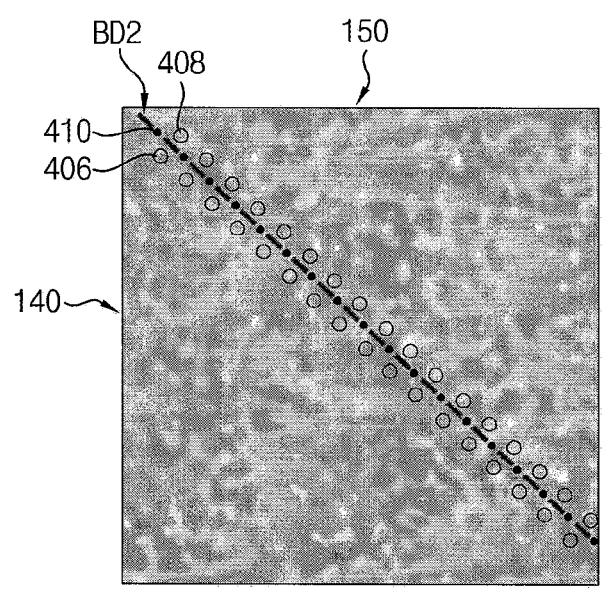
Figure 4B:
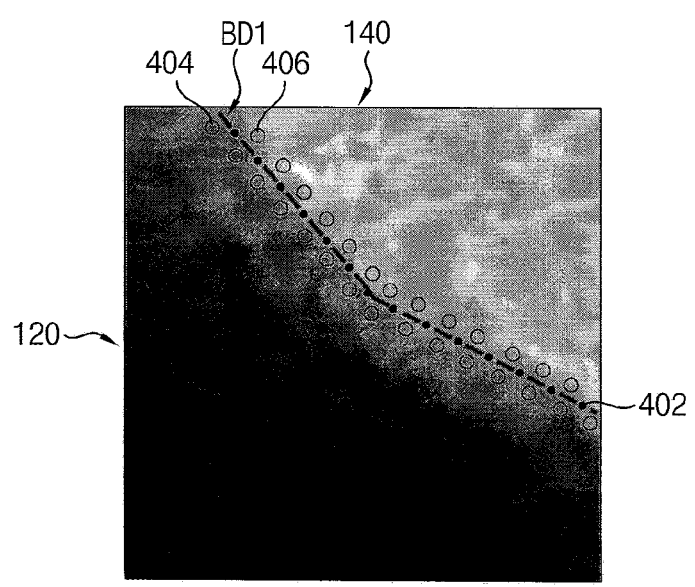

FIG. 3, FIG. 4A, and FIG. 4B are diagrams for describing an original image used in the method of measuring the thickness according to some example embodiments. FIG. 3 illustrates an example of an original image OIMG1 that is a planar image of the semiconductor element 200 of FIG. 2. For example, the original image OIMG1 of FIG. 3 may be captured in a plan view or in a plane taken along line III-III' of FIG. 2. FIG. 4A is an example of an enlarged view of a region A1 in the original image OIMG1 of FIG. 3, and FIG. 4B is an example of an enlarged view of a region A2 in the original image OIMG1 of FIG. 3.

Referring to FIGS. 2, 3, 4A and 4B, the hole structure 160 may have a shape that is similar to a circular shape in a plan view. For example, as illustrated in FIG. 3, the hole structure in the original image OIMG1 may include the first layer 140 and the filling layer pattern 150 inside the first layer 140. The first layer 140 may have a shape that is similar to a ring shape in a plan view, and the filling layer pattern 150 may have a shape that is similar to a circular shape in a plan view. In addition, at least one layer (e.g., the uppermost layer 120) of the semiconductor element of FIG. 2 may be formed outside the first layer 140.

In the original image OIMG1, the first layer 140 may include a first boundary BD1 (e.g., one of two boundaries) and a second boundary BD2 (e.g., the other of two boundaries). The first boundary BD1 may be formed between the layer 120 and the first layer 140, and the second boundary BD2 may be formed between the first layer 140 and the filling layer pattern 150. Due to variations or deviations in the manufacturing processes, the first layer 140 may include irregular and/or nonsmooth boundaries BD1 and BD2.

In some example embodiments, material of the first layer 140 may have properties that are similar to those of material of the filling layer pattern 150, and thus it may be relatively difficult to detect the second boundary BD2 in the original image OIMG1. In some example embodiments, the second boundary BD2 may be substantially indistinguishable in the original image OIMG1. For example, as illustrated in FIG. 4A, when the region A1 in FIG. 3 that includes a portion of the second boundary BD2 is magnified, a lower-left portion with respect to a dotted line in FIG. 4A may represent a portion of the first layer 140, and an upper-right portion with respect to the dotted line in FIG. 4A may represent a portion of the filling layer pattern 150. Since differences between grayscales representing the first layer 140 and grayscales representing the filling layer pattern 150 are relatively small in the original image OIMG1, it may be difficult to detect, and thus extract, the second boundary BD2 from OIMG1, which is illustrated as the dotted line in FIG. 4A, based on user's eyes and/or various boundary detection algorithms. In FIG. 3, the second boundary BD2, which is detected with difficulty, is illustrated as a dotted line.

In some example embodiments, the material of the first layer 140 may have properties that are different from those of material of the layer 120, and thus it may be relatively easy to detect, and thus extract, the first boundary BD1 in the original image OIMG1. For example, as illustrated in FIG. 4B, when the region A2 in FIG. 3 that includes a portion of the first boundary BD1 is magnified, a lower-left portion with respect to a dotted line in FIG. 4B may represent a portion of the layer 120, and an upper-right portion with respect to the dotted line in FIG. 4B may represent a portion of the first layer 140. Since differences between grayscales representing the layer 120 and the grayscales representing the first layer 140 are relatively large in the original image OIMG1, it may be easy to detect the first boundary BD1, which is illustrated as the dotted line in FIG. 4B, based on the user's eyes and/or the various boundary detection algorithms. In FIG. 3, the first boundary BD1, which is easily detected, is illustrated as a solid line.

In some example embodiments, the hole structure 160 may be represented in the original image OIMG1 based on rectangular coordinates. In the rectangular coordinates, each point may be uniquely specified in a plane by a horizontal axis direction X and a vertical axis direction Y crossing (e.g., substantially perpendicular to) the horizontal axis direction X.

Figure 5:
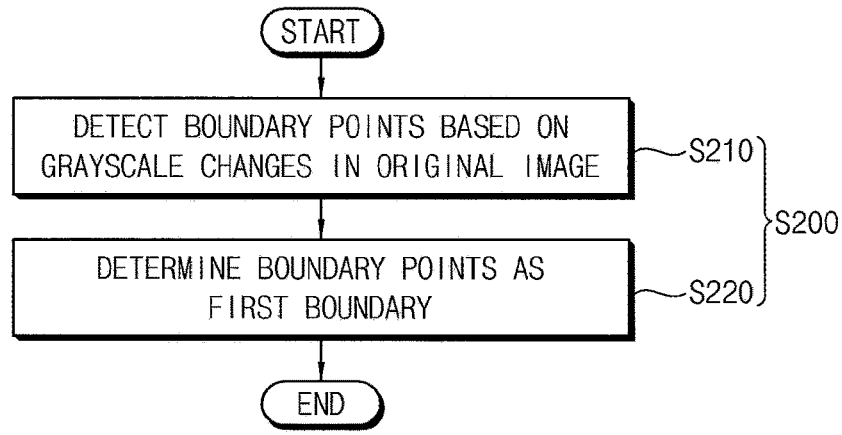
FIG. 5 is a flow chart illustrating an example of extracting a first boundary in FIG. 1.

FIG. 5 is a flow chart illustrating an example of extracting a first boundary in FIG. 1.

Referring to FIGS. 1 and 5, in the step S200, a plurality of boundary points 402 may be detected from the original image based on grayscale changes in the original image (step S210).

In some example embodiments, differences between grayscales of the plurality of boundary points 402 and grayscales of a plurality of neighboring points 404 adjacent to the plurality of boundary points 404, 406 may be greater than a threshold grayscale. Grayscales may be included in pixel color values, such that a boundary point 402 may be determined based on a color value difference between the boundary point 402 and one or more neighboring points 404. For example, a difference between a grayscale of a first boundary point 402 among the plurality of boundary points and a grayscale of a first point 404 adjacent to the first boundary point may be greater than the threshold grayscale. As described above with reference to FIGS. 3, 4A and 4B, the differences between the grayscales of points 404 representing the layer 120 and the grayscales of points 406 representing the first layer 140 may be relatively large in the original image OIMG1 (e.g., the layer 120 may be represented as a first grayscale, and the first layer 140 may be represented as a second grayscale different from the first grayscale). Thus, a plurality of points 402 (e.g., pixel points) that correspond to the first boundary BD1 between the points 404 of layer 120 and the points 406 of first layer 140 may be detected as the plurality of boundary points 402.

On the other hand, the differences between the grayscales (also referred to herein as color values) of points 406 representing the first layer 140 and the grayscales of points 408 representing the filling layer pattern 150 may be relatively small in the original image OIMG1 (e.g., the first layer 140 may be represented as the second grayscale, and the filling layer pattern 150 may be represented as a third grayscale similar to the second grayscale). For example, the difference between the color values, grayscales, etc. of points 410, 406, 408 in the original image OIMG1 may be below a threshold minimum difference magnitude according to which the second boundary BD2 may be detected in the original image OIMG1 according to a grayscale difference, color value difference, etc. Thus, the second boundary BD2 may be substantially indistinguishable in the original image OIMG1, such that a plurality of points 410 that correspond to the first layer 140, the filling layer pattern 150 and the second boundary BD2 between the first layer 140 and the filling layer pattern 150 may not be detected as the plurality of boundary points 410.

In some example embodiments, the plurality of boundary points may correspond to high frequency components of the original image. The original image OIMG1 may be analyzed and may be divided into the high frequency components and low frequency components. Regions corresponding to the high frequency components of the original image OIMG1 may be detected as the plurality of boundary points. For example, the high frequency components may be obtained when a difference between grayscales of adjacent pixels is relatively large (e.g., when the difference is greater than the threshold grayscale). The low frequency components may be obtained when a difference between grayscales of adjacent pixels is relatively small (e.g., when the difference is equal to or less than the threshold grayscale).

The plurality of boundary points 402 may be determined as one of two boundaries of the first layer (step S220). For example, as illustrated in FIG. 3, the line BD1 including the plurality of boundary points in the original image OIMG1 may be determined as one of two boundaries of the first layer 140. The line BD1 may be determined as a line at least partially extending through the plurality of boundary points 402. In some example embodiments, the line BD1 may be determined based on regression analysis of the points 402 according to one or more algorithmic regression functions to determine a line BD1 at least partially defined by the points 402. For example, the line BD1 may be determined based on linear regression of the points 402 to determine a linear line BD1 at least partially defined by the points 402.

Figure 6:
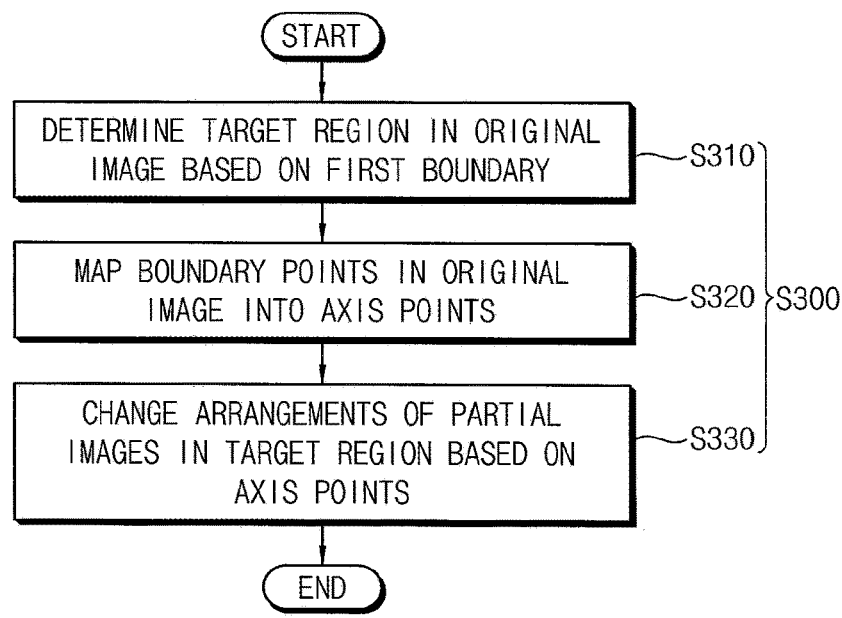
FIG. 6 is a flow chart illustrating an example of converting an original image into a first image in FIG. 1.
Figure 7:
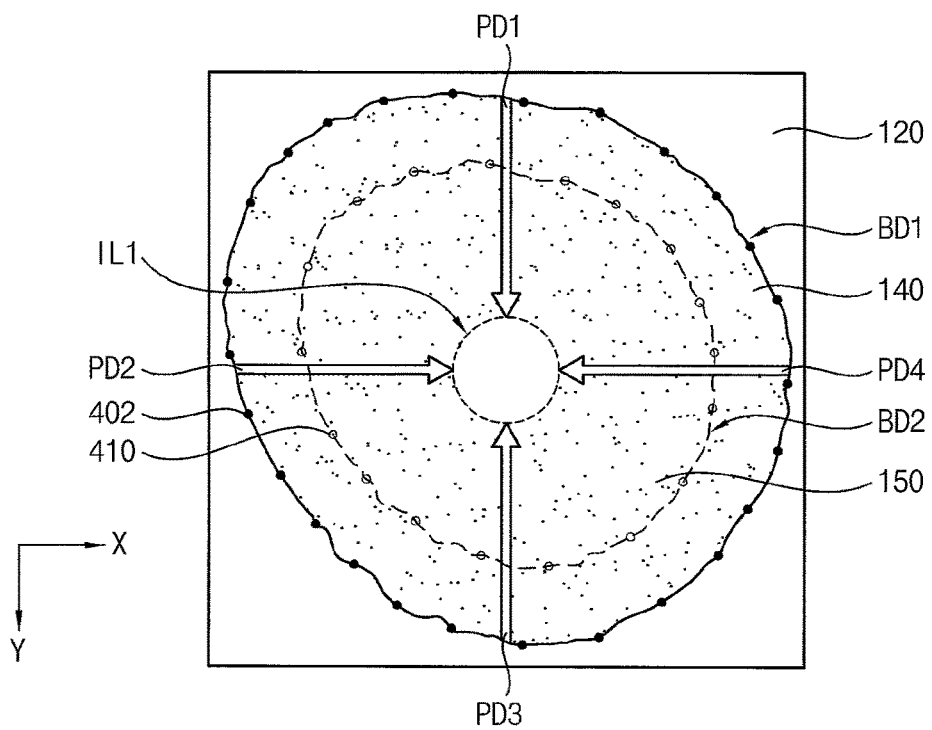
FIG. 7 and FIG. 8 are diagrams for describing the example of converting the original image into the first image of FIG. 6.
Figure 8:
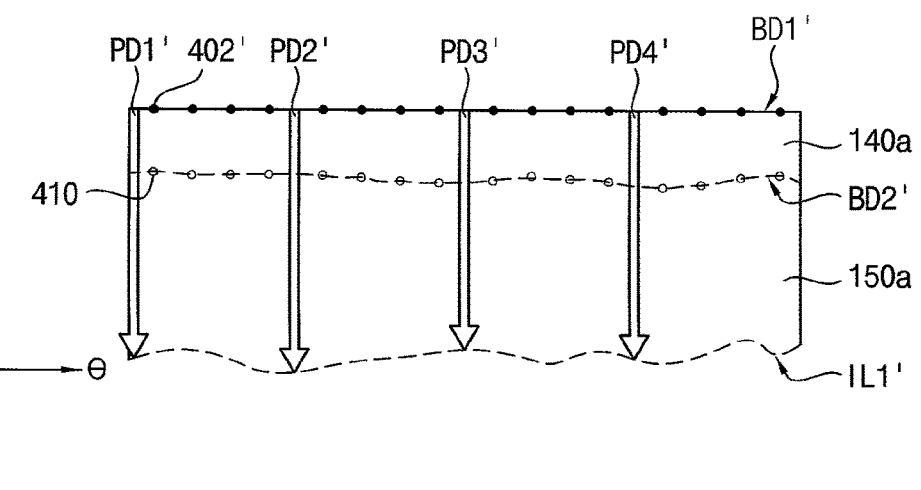

FIG. 6 is a flow chart illustrating an example of converting an original image into a first image in FIG. 1. FIG. 7 and FIG. 8 are diagrams for describing the example of converting the original image into the first image of FIG. 6. FIG. 7 illustrates an example of an original image OIMG1 that is substantially the same as the original image OIMG1 of FIG. 3. FIG. 8 illustrates an example of a first image IMG11 that is converted from the original image OIMG1 of FIG. 7.

Referring to FIGS. 1, 6, 7 and 8, in the step S300, a target region may be determined in the original image based on the first boundary (step S310). The target region may be associated with the structure and the first layer in the original image. For example, the target region may include a portion of the structure and the whole of the first layer. The target region may be referred to as an interest region or a region of interest (ROI).

As illustrated in FIG. 7, the target region (e.g., a region represented with dots in FIG. 7) may be determined in the original image OIMG1 based on the first boundary BD1 such that the target region includes the whole of the first layer 140. For example, a first line IL1, which is an imaginary line or a virtual line, may be determined (detected) in the original image OIMG1, and a region between the first boundary BD1 and the first line IL1 may be determined as the target region in the original image OIMG1.

As shown in FIGS. 7-8, the plurality of boundary points 402 in the original image may be mapped into a plurality of axis points 402' in the first image (step S320). As described above with reference to FIG. 5, the plurality of boundary points 402 may correspond to the first boundary.

As illustrated in FIG. 7, the plurality of boundary points 402 corresponding to the first boundary BD1 may be non-linearly arranged in the original image OIMG1. For example, the plurality of boundary points 402 may be arranged with a circular shape or an elliptical shape in the original image OIMG1. As illustrated in FIG. 8, the plurality of axis points 402' corresponding to a third boundary BD1' may be linearly arranged in the first image IMG11. The linear line BD1' in FIG. 8 including the plurality of axis points may be substantially parallel with an angle axis direction θ. In other words, in the method of measuring the thickness according to some example embodiments, the first boundary BD1 that is nonlinearly formed in the original image OIMG1 may be rearranged into the third boundary BD1' that is linearly formed in the first image IMG11. The third boundary BD1' may extend in parallel or substantially in parallel with an axis line of the first image IMG11. For example, as shown in FIG. 8, boundary BD1' extends substantially in parallel with an axis line θ.

The first image may be obtained by changing arrangements of a plurality of partial images in the target region based on the plurality of axis points (step S330) so that the plurality of axis points 402' in the new arrangement of the partial images define a line BD1' that extends in parallel or substantially in parallel with an axis line.

As illustrated in FIGS. 7 and 8, partial images PD1 (e.g., pixel images) in the original image OIMG1 may be rearranged into partial images PD1' in the first image IMG11. The partial images PD1 in the original image OIMG1 may be arranged from a first boundary point on the first boundary BD1 to a first point on the first line IL1, and the partial images PD1' in the first image IMG11 may be arranged from a first boundary point on the third boundary BD1' to a first point on a second line IL1'.

Similarly, partial images PD2 in the original image OIMG1 may be rearranged into partial images PD2' in the first image IMG11, partial images PD3 in the original image OIMG1 may be rearranged into partial images PD3' in the first image IMG11, and partial images PD4 in the original image OIMG1 may be rearranged into partial images PD4' in the first image IMG11. The partial images PD2 in the original image OIMG1 may be arranged from a second boundary point on the first boundary BD1 to a second point on the first line IL1, and the partial images PD2' in the first image IMG11 may be arranged from a second boundary point on the third boundary BD1' to a second point on the second line IL1'. The partial images PD3 in the original image OIMG1 may be arranged from a third boundary point on the first boundary BD1 to a third point on the first line IL1, and the partial images PD3' in the first image IMG11 may be arranged from a third boundary point on the third boundary BD1' to a third point on the second line IL1'. The partial images PD4 in the original image OIMG1 may be arranged from a fourth boundary point on the first boundary BD1 to a fourth point on the first line IL1, and the partial images PD4' in the first image IMG11 may be arranged from a fourth boundary point on the third boundary BD1' to a fourth point on the second line IL1'.

Although the rearrangement operation are described based on the partial images PD1~PD4 in the original image OIMG1 in FIG. 7 and the partial images PD1'~PD4' in the first image IMG11 in FIG. 8, the rearrangement operation may be performed on all of partial images in the target region.

The original image OIMG1 may be converted into the first image IMG11 by changing the arrangements of at least a portion of or all of the partial images in the target region based on the angle axis direction θ and a radius axis direction R crossing (e.g., substantially perpendicular to) the angle axis direction θ. For example, the partial images in the target region in the original image OIMG1 may be rearranged with respect to the third boundary BD1', which is substantially parallel with the angle axis direction θ (e.g., an axis line extending along angle axis direction θ), along with the radius axis direction R. By converting the original image OIMG1 into the first image IMG11, the first boundary BD1, the second boundary BD2, the first line IL1, the first layer 140 and the filling layer pattern 150 in the original image OIMG1 may be converted into the third boundary BD1', a fourth boundary BD2', the second line IL1', a first layer 140*a* and a filling layer pattern 150*a* in the first image IMG11, respectively. In FIG. 8, the fourth boundary BD2' is illustrated as a dotted line because the fourth boundary BD2' is still relatively difficult to detect in the first image IMG11.

In some example embodiments, the hole structure 160 may be represented in the first image IMG11 based on polar coordinates. In the polar coordinates, each point may be uniquely specified in a plane by the radius axis direction R and the angle axis direction θ. The third boundary BD1' in the first image IMG11 may be substantially parallel with the angle axis direction θ. In other words, a coordinate conversion may be performed by the step S300, and thus the original image OIMG1 represented by the rectangular coordinates may be converted into the first image IMG11 represented by the polar coordinates.

Figure 9:
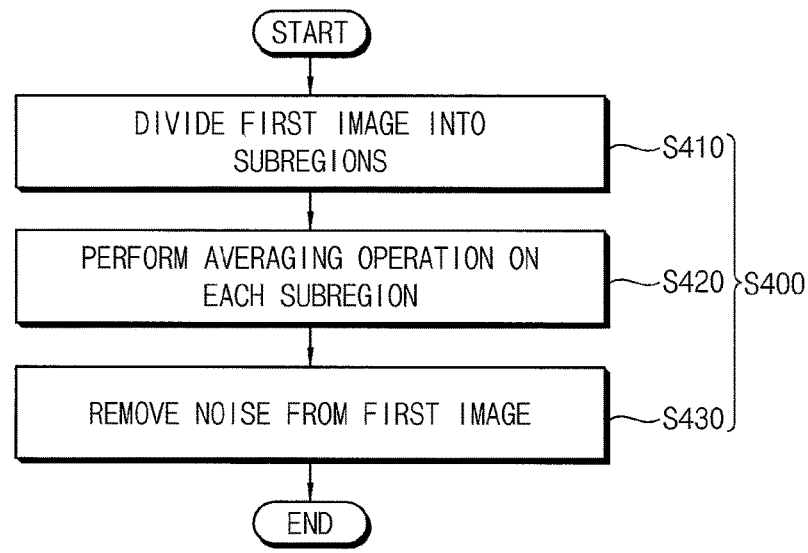
FIG. 9 is a flow chart illustrating an example of generating a second image in FIG. 1.
Figure 10:
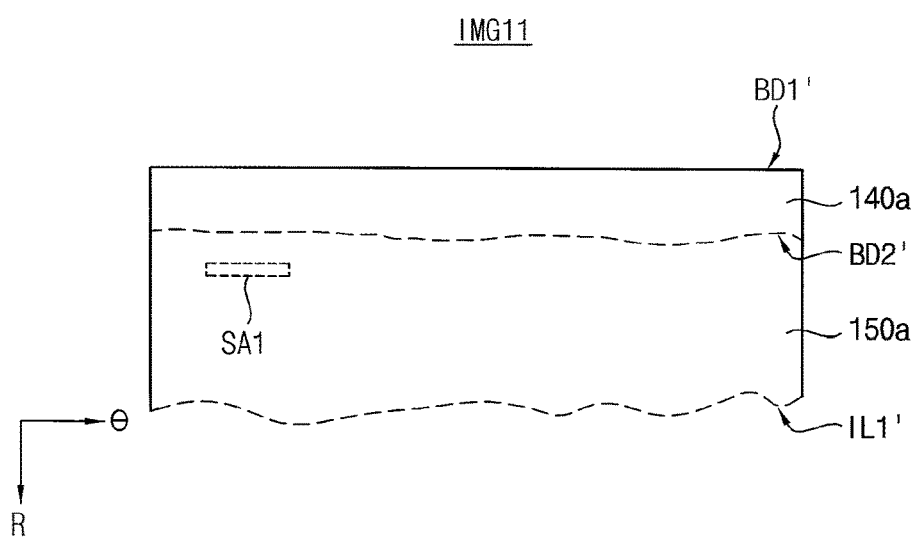
FIG. 10, FIG. 11A, FIG. 11B, FIG. 12 and FIG. 13 are diagrams for describing the example of generating the second image of FIG. 9.
Figure 11A:
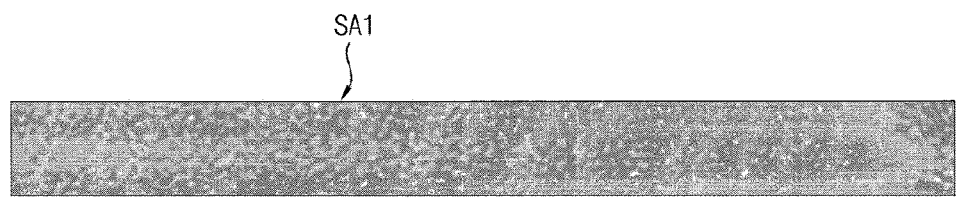
Figure 11B:
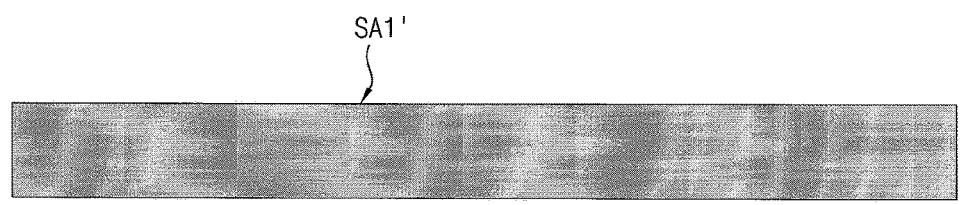
Figure 12:
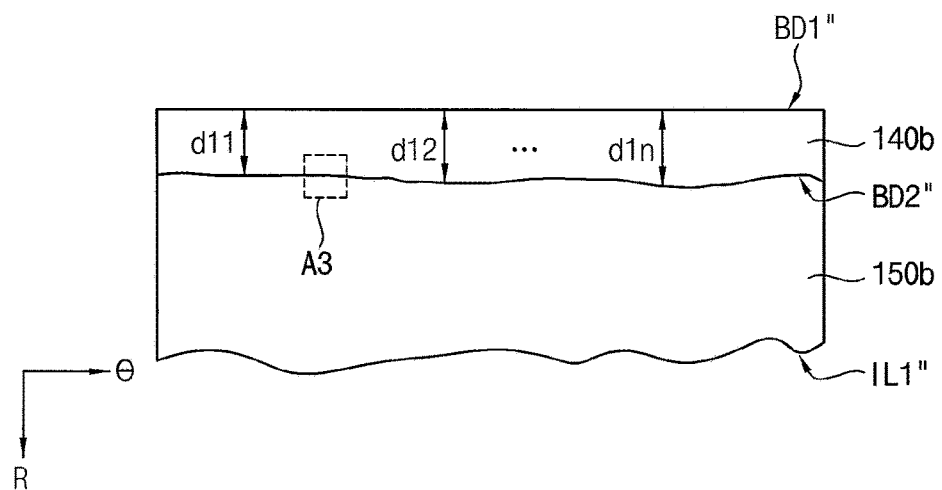
Figure 13:
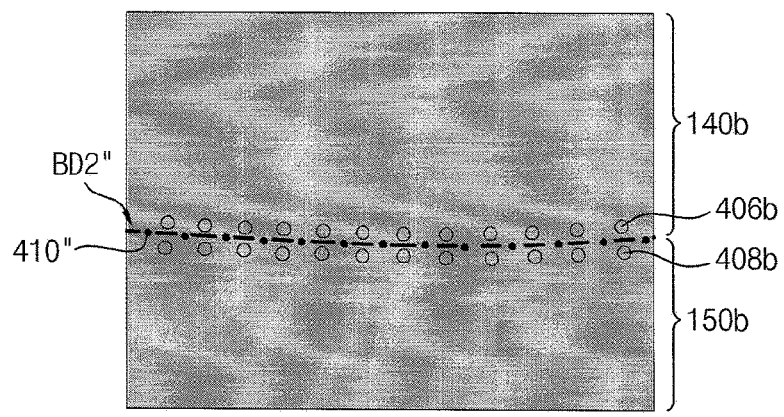

FIG. 9 is a flow chart illustrating an example of generating a second image in FIG. 1. FIG. 10, FIG. 11A, FIG. 11B, FIG. 12 and FIG. 13 are diagrams for describing the example of generating the second image of FIG. 9. FIG. 10 illustrates an example of a first image IMG11 that is substantially the same as the first image IMG11 of FIG. 8. FIGS. 11A and 11B are examples of an enlarged view of a first subregion SA1 in FIG. 10. FIG. 12 illustrates an example of a second image IMG12 that is generated based on the first image IMG11 of FIG. 10. FIG. 13 is an example of an enlarged view of a region A3 in FIG. 12.

Referring to FIGS. 1, 9, 10, 11A, 11B, 12 and 13, in the step S400, the first image may be divided into a plurality of subregions (step S410). For example, each of the plurality of subregions may have a rectangular shape that has a relatively long side and a relatively short side.

As illustrated in FIG. 10, the first image IMG11 may be divided into the plurality of subregions. The first subregion SA1 among the plurality of subregions may have a rectangular shape. For example, the first subregion SA1 may have a first side (e.g., a relatively long side) that extends in the angle axis direction θ and a second side (e.g., a relatively short side) that extends in the radius axis direction R. The second side may be shorter than the first side. In other words, a relatively long side of the first subregion SA1 may be substantially parallel with the third boundary BD1' including the plurality of axis points.

An averaging operation may be performed on each of the plurality of subregions (step S420). As shown in FIGS. 11A-B, an averaging operation may be performed on a subregion SA1 to generate an averaged subregion SA1'. For example, the averaging operation may be performed based on a Gaussian filter.

In some example embodiments, the first subregion SA1 may be averaged by calculating an average grayscale of partial images (e.g., pixel images) in the first subregion SA1, and by changing all of grayscales of the partial images in the first subregion SA1 into the average grayscale.

As illustrated in the subregion SA1 shown in FIG. 11A, before the averaging operation (e.g., the grayscale averaging) is performed to generate subregion SA1', it may be relatively difficult to detect the fourth boundary BD2' in the first image IMG11 because of an excessively high picture quality. As illustrated in FIG. 11B, after the averaging operation is performed based on the plurality of subregions, including the illustrated subregion SA1', each of which has a relatively long side substantially parallel with the angle axis direction θ and the third boundary BD1', it may be relatively easy to detect the boundary BD2' (e.g., the other of two boundaries of the first layer) that is parallel or substantially parallel with the angle axis direction θ.

In some example embodiments, noise may be removed from the first image (step S430). For example, the noise included in the first image may be linear noise, and then the noise may be removed from the first image based on a domain transform filter. According to some example embodiments, step S430 may be performed before the steps S410 and S420, or may be omitted.

The second image may be obtained by performing the averaging operation (e.g., the steps S410 and S420) and/or the noise removing operation (e.g., the step S430) on the first image.

As illustrated in FIG. 12, the second image IMG12 may be finally obtained. By converting the first image IMG11 into the second image IMG12, the third boundary BD1', the fourth boundary BD2', the second line IL1', the first layer 140a and the filling layer pattern 150a in the first image IMG11 may be converted into a fifth boundary BD1", a sixth boundary BD2", a third line IL1", a first layer 140b and a filling layer pattern 150b in the second image IMG12, respectively. The fifth boundary BD1" in the second image IMG12 may be substantially the same as the first boundary BD1' in the first image IMG11, and may be substantially parallel with the angle axis direction θ.

In some example embodiments, similar to the first image IMG11, the hole structure 160 may be represented in the second image IMG12 based on the polar coordinates with the angle axis direction θ and the radius axis direction R.

The other of two boundaries of the first layer is extracted from the second image (step S500 in FIG. 1).

In comparison with the original image OIMG1 of FIGS. 3 and 7 and the first image IMG11 of FIGS. 8 and 10, it may be easy to detect the sixth boundary BD2" (e.g., the other of two boundaries of the first layer) in the second image IMG12. For example, as illustrated in FIG. 13, when the region A3 in FIG. 12 that includes a portion of the sixth boundary BD2" is magnified, a lower portion in FIG. 13 may represent a portion of the filling layer pattern 150b, and an upper portion in FIG. 13 may represent a portion of the first layer 140b. Differences between grayscales of points 406b representing the first layer 140b and grayscales of points 408b representing the filling layer pattern 150b may be relatively large in the second image IMG12. In comparison with FIG. 4A, the grayscale difference may be relatively high in FIG. 13, such that the grayscale difference is above a minimum threshold according to which a plurality of boundary points may be detected based on grayscale differences. Thus, in FIG. 12, the sixth boundary BD2" is illustrated as a solid line because the sixth boundary BD2" is relatively easy to detect in the second image IMG12. The sixth boundary BD2" may be detected as a plurality of points 410" that are determined to at least partially define the sixth boundary BD2". The points 410" may be determined based on determining that a grayscale difference between the points 410" and one or more of points 406b, 408b exceeds a threshold difference. The sixth boundary BD2" may be detected through a similar process used to detect the first boundary BD1, as described above with reference to FIGS. 2, 3, 4A, 4B, and 5. For example, the points 410" may be detected through grayscale changes relative to one or more of points 406b, 408b, and the sixth boundary BD2" may be detected based on regression analysis of the detected points 410".

The thickness of the first layer is calculated based on the second image (step S600 in FIG. 1). For example, the thickness of the first layer may be calculated based on one (e.g., the linearly rearranged boundary BD1" in FIG. 12) of two boundaries of the first layer in the second image and the other (e.g., the boundary BD2" extracted by the step S500) of two boundaries of the first layer in the second image.

As illustrated in FIG. 12, in the second image IMG12, thicknesses of the first layer 140b may be calculated by measuring a distance d11 between a first point on the fifth boundary BD1" and a first point on the sixth boundary BD2", by measuring a distance d12 between a second point on the fifth boundary BD1" and a second point on the sixth boundary BD2", and by measuring a distance d1n between a n-th point on the fifth boundary BD1" and a n-th point on the sixth boundary BD2", where n is a natural number equal to or greater than two.

In the method of measuring the thickness according to some example embodiments, the thickness of the first layer may be efficiently (e.g., rapidly and precisely) obtained when the thickness of the first layer 140b is measured based on the second image IMG12 of FIG. 12. In addition, in the method of measuring the thickness according to some example embodiments, the thickness of the first layer may not be manually obtained, but may be automatically obtained based on the boundary (e.g., the boundary BD1" in FIG. 12) that are linearly rearranged in the second image.

Figure 14:
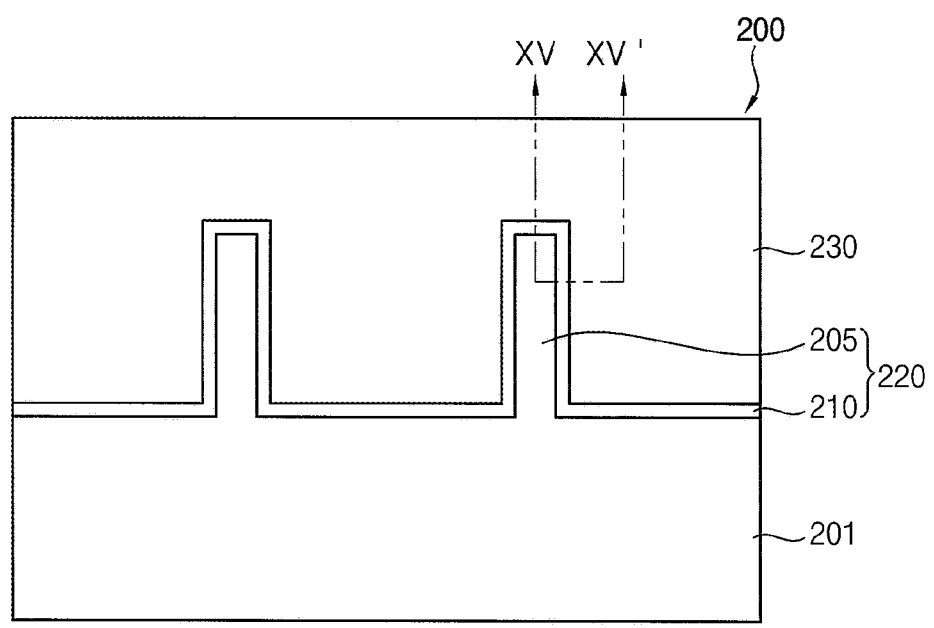
FIG. 14 is a cross-sectional view illustrating an example of a structure having a first layer to be measured based on the method of measuring the thickness according to some example embodiments.

FIG. 14 is a cross-sectional view illustrating an example of a structure having a first layer to be measured based on the method of measuring the thickness according to some example embodiments.

Referring to FIG. 14, a semiconductor element 200 may include a substrate 201, a protrusion 205, a first layer 210 and an insulation layer 230. The protrusion 205 and the first layer 210 may form a fin structure 220. The substrate 201 in FIG. 14 may be substantially the same as the substrate 101 in FIG. 2.

To manufacture the semiconductor element 200 of FIG. 14, the protrusion 205 may be formed on the substrate 201, and then the first layer 210 and the insulation layer 230 may be sequentially formed on the substrate 201 on which the protrusion 205 is formed. In other words, the first layer 210 may be deposited on the fin structure 220.

In some example embodiments, some of upper portions of the substrate 201 other than a portion for forming the protrusion 205 may be dry and/or wet etched with a desired (and/or alternatively predetermined) or given depth to form the protrusion 205. For example, the protrusion 205 may be formed to include a nitride, the first layer 210 may be formed to include a silicon nitride, and the insulation layer 230 may be formed to include, for example, an insulating material (e.g., an oxide).

In some example embodiments, the semiconductor element 200 of FIG. 14 may be a semiconductor transistor, and then the fin structure 220 may be a channel fin structure in the semiconductor transistor.

Figure 17:
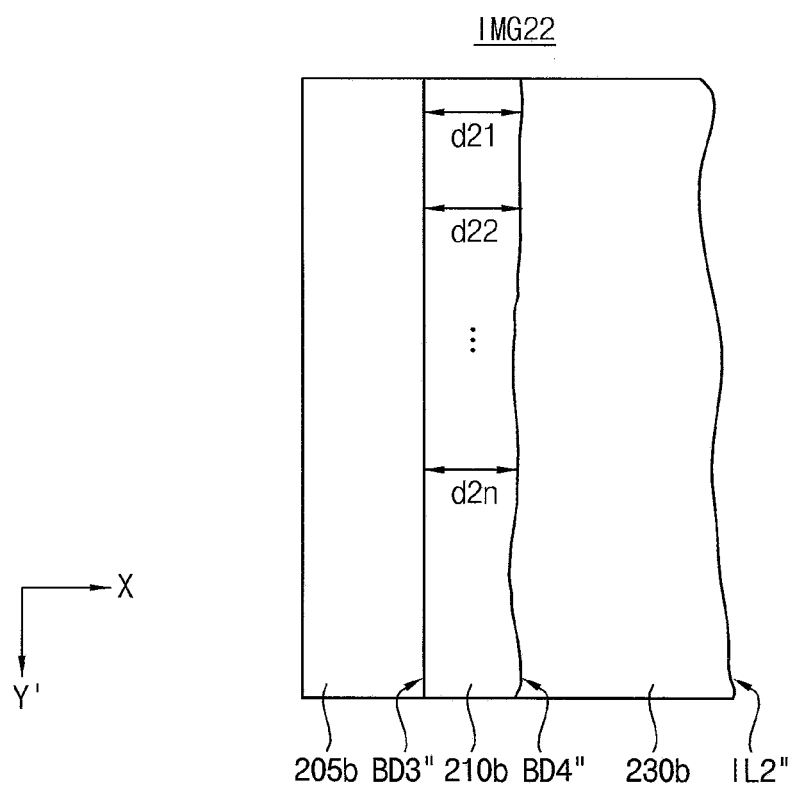

FIGS. 15, 16 and 17 are diagrams for describing the method of measuring the thickness according to some example embodiments. FIG. 15 illustrates an example of an original image OIMG2 that is a planar image of the semiconductor element of FIG. 14. The original image OIMG2 of FIG. 15 may be captured in a plan view or in a plane taken along line XV-XV' of FIG. 14. FIG. 16 illustrates an example of a first image IMG21 that is converted from the original image OIMG2 of FIG. 15. FIG. 17 illustrates an example of a second image IMG22 that is generated based on the first image IMG21 of FIG. 16.

Referring to FIGS. 1, 14, 15, 16 and 17, in the method of measuring the thickness according to some example embodiments, an original image including image information of a structure having a first layer is obtained (step S100). As illustrated in FIG. 15, in the original image OIMG2, the fin structure 220 may include the protrusion 205 and the first layer 210. The insulation layer 230 of the semiconductor element of FIG. 14 may be formed outside (e.g., on the right side of) the first layer 210. The fin structure 220 may be represented in the original image OIMG2 based on first rectangular coordinates with a horizontal axis direction X and a first vertical axis direction Y.

The first layer 210 may include a first boundary BD3 (e.g., one of two boundaries) and a second boundary BD4 (e.g., the other of two boundaries). The first boundary BD3 may be formed between the protrusion 205 and the first layer 210, and the second boundary BD4 may be formed between the first layer 210 and the layer 230. As illustrated in FIG. 15, the first layer 210 may include irregular and/or nonsmooth boundaries BD3 and BD4. In addition, in the original image OIMG2, it may be relatively easy to detect the first boundary BD3, and it may be relatively difficult to detect the second boundary BD4.

One of two boundaries of the first layer is extracted from the original image (step S200). As described above with reference to FIG. 5, a plurality of boundary points may be detected from the original image OIMG2 based on grayscale changes in the original image OIMG2, and the plurality of boundary points may be determined as one of two boundaries (e.g., the first boundary BD3). Differences between grayscales of the plurality of boundary points and grayscales of a plurality of neighboring points adjacent to the plurality of boundary points may be greater than a threshold grayscale. For example, the plurality of boundary points may correspond to high frequency components of the original image OIMG2.

The original image is converted into a first image based on the one of two boundaries of the first layer (step S300). As described above with reference to FIG. 6, a target region may be determined in the original image OIMG2 based on the first boundary BD3, the plurality of boundary points in the original image OIMG2 may be mapped into a plurality of axis points in the first image IMG21, and the first image IMG21 may be obtained by changing arrangements of a plurality of partial images (e.g., PD5 and PD6) in the target region based on the plurality of axis points.

For example, as illustrated in FIG. 15, the target region (e.g., a region represented with dots in FIG. 15) may be determined in the original image OIMG2 based on the first boundary BD3 and a first line IL2 such that the target region includes the whole of the first layer 210. The plurality of boundary points corresponding to the first boundary BD3 may be nonlinearly arranged in the original image OIMG2. As illustrated in FIG. 16, the plurality of axis points corresponding to a third boundary BD3' may be linearly arranged in the first image IMG21. A linear line BD3' in FIG. 16 including the plurality of axis points may be substantially parallel with a second vertical axis direction Y'.

The partial images PD5 (e.g., pixel images) in the original image OIMG2 may be rearranged into partial images PD5' in the first image IMG21, and the partial images PD6 in the original image OIMG2 may be rearranged into partial images PD6' in the first image IMG21. The partial images PD5 in the original image OIMG2 may be arranged from a first boundary point on the first boundary BD3 to a first point on the first line IL2, and the partial images PD5' in the first image IMG21 may be arranged from a first boundary point on the third boundary BD3' to a first point on a second line IL2'. The partial images PD6 in the original image OIMG2 may be arranged from a second boundary point on the first boundary BD3 to a second point on the first line IL2, and the partial images PD6' in the first image IMG21 may be arranged from a second boundary point on the third boundary BD3' to a second point on the second line IL2'. By converting the original image OIMG2 into the first image IMG21, the first boundary BD3, the second boundary BD4, the first line IL2, the protrusion 205, the first layer 210 and the layer 230 in the original image OIMG2 may be converted into the third boundary BD3', a fourth boundary BD4', the second line IL2', a protrusion 205a, a first layer 210a and a layer 230a in the first image IMG21, respectively.

The fin structure 220 may be represented in the first image IMG21 based on second rectangular coordinates with the horizontal axis direction X and the second vertical axis direction Y'. The first vertical axis direction Y for representing the original image OIMG2 may be different from the second vertical axis direction Y' for representing the first image IMG21.

A second image is generated by performing a filtering operation on the first image (step S400). As described above with reference to FIG. 9, the first image may be divided into a plurality of subregions, an averaging operation may be performed on each of the plurality of subregions, noise may be removed from the first image, and thus the second image may be obtained. In addition, the other of two boundaries of the first layer is extracted from the second image (step S500), and the thickness of the first layer is calculated based on the second image that includes the linearly rearranged boundary and the other extracted boundary (step S600).

For example, as illustrated in FIG. 16, the first image IMG21 may be divided into the plurality of subregions. A first subregion SA2 among the plurality of subregions may have a rectangular shape. For example, the first subregion SA2 may have a first side that extends in the second vertical axis direction Y' and a second side that extends in the horizontal axis direction X. The second side may be shorter than the first side. The first subregion SA2 may be averaged by calculating an average grayscale of partial images (e.g., pixel images) in the first subregion SA2, and by changing all of grayscales of the partial images in the first subregion SA2 into the average grayscale. In addition, the noise may be selectively removed from the first image IMG21.

As illustrated in FIG. 17, the second image IMG22 may be finally obtained. By converting the first image IMG21 into the second image IMG22, the third boundary BD3', the fourth boundary BD3', the second line IL2', the protrusion 205a, the first layer 210a and the layer 230a in the first image IMG21 may be converted into a fifth boundary BD3", a sixth boundary BD4", a third line IL2", a protrusion 205b, a first layer 210b and a layer 230b in the second image IMG22, respectively. In the second image IMG22, thicknesses of the first layer 210b may be calculated by measuring a distance d21 between a first point on the fifth boundary BD3" and a first point on the sixth boundary BD4", by measuring a distance d22 between a second point on the fifth boundary BD3" and a second point on the sixth boundary BD4", and by measuring a distance d2n between a n-th point on the fifth boundary BD3" and a n-th point on the sixth boundary BD4".

In some example embodiments, similar to the first image IMG21, the fin structure 220 may be represented in the second image IMG22 based on the second rectangular coordinates with the horizontal axis direction X and the second vertical axis direction Y'.

Figure 18:
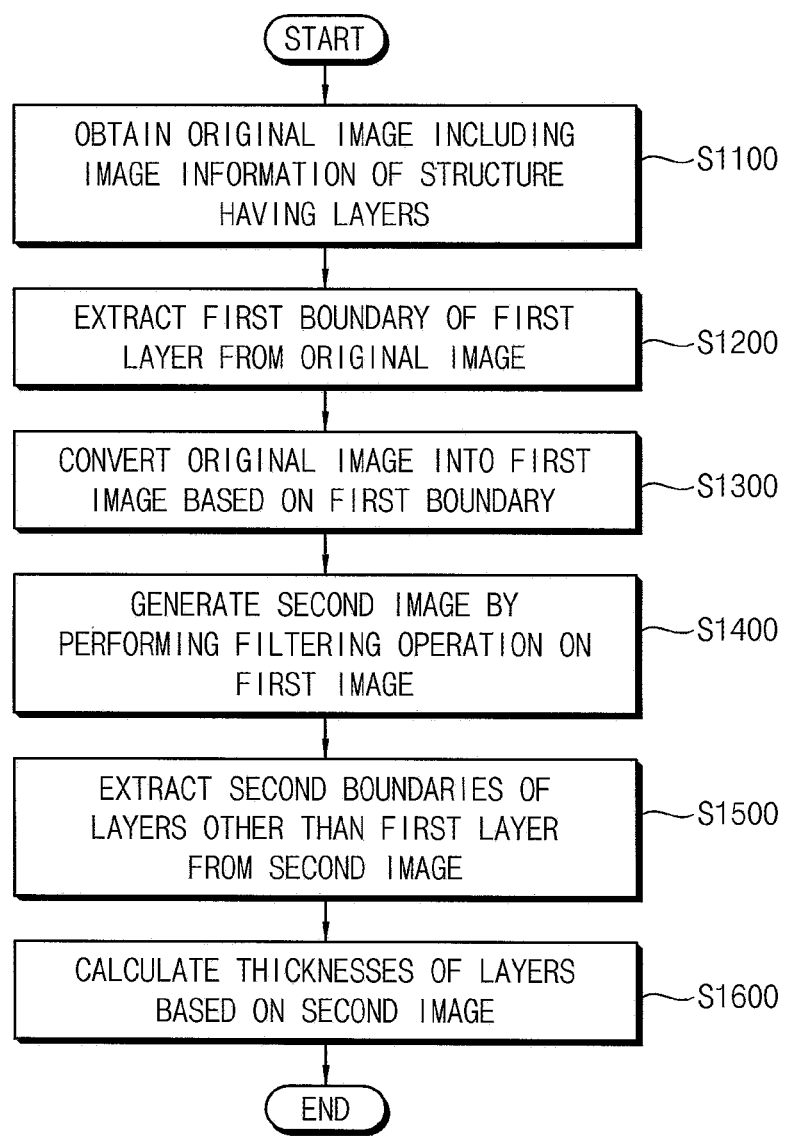
FIG. 18 is a flow chart illustrating a method of measuring a thickness according to some example embodiments.
Figure 19:
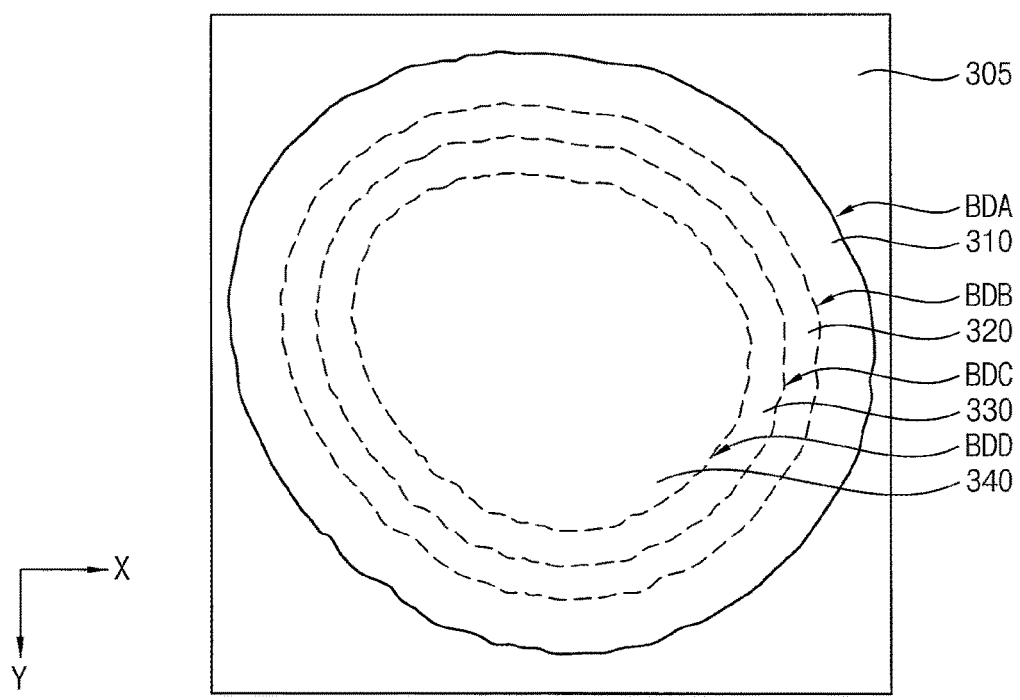
FIG. 19, FIG. 20 and FIG. 21 are diagrams for describing the method of measuring the thickness according to some example embodiments.
Figure 20:
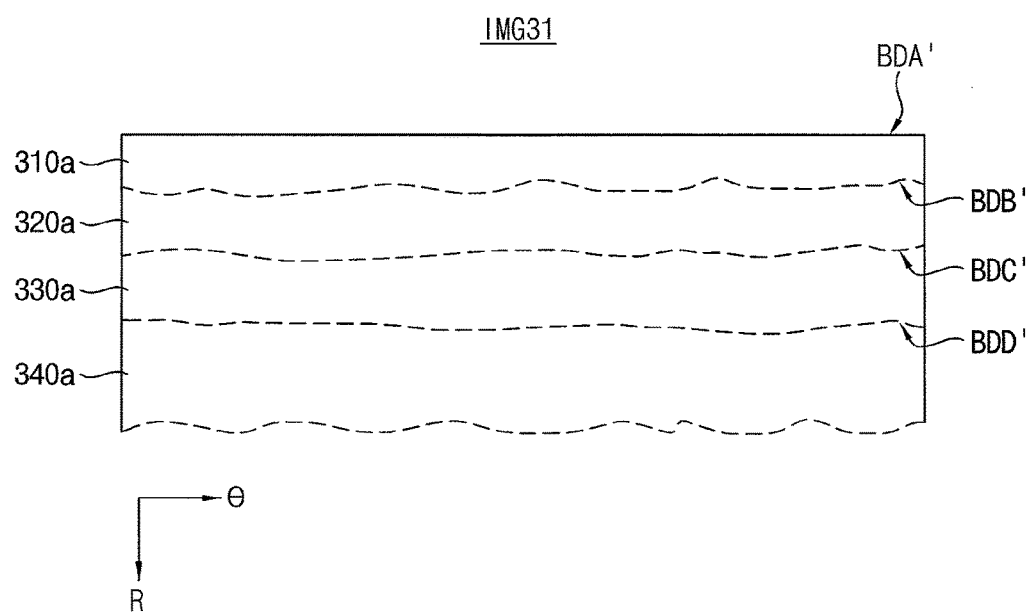
Figure 21:
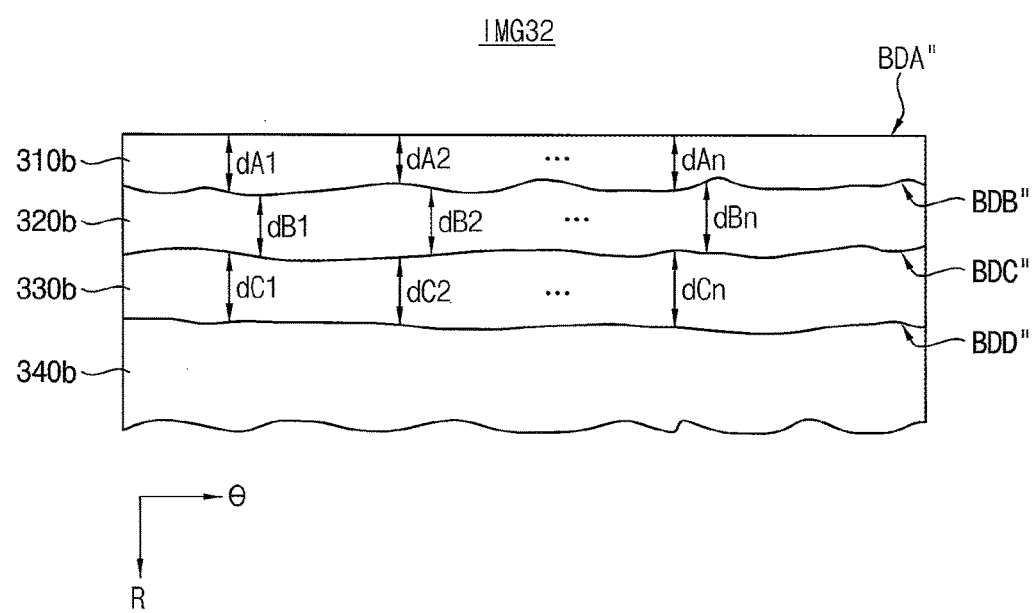

FIG. 18 is a flow chart illustrating a method of measuring a thickness according to some example embodiments. FIGS. 19, 20 and 21 are diagrams for describing the method of measuring the thickness according to some example embodiments. FIGS. 19, 20 and 21 illustrate images associated with a hole structure that is similar to the hole structure 160 in FIG. 2. FIG. 19 illustrates an example of an original image OIMG3 representing the hole structure in a plan view. FIG. 20 illustrates an example of a first image IMG31 that is converted from the original image OIMG3 of FIG. 19. FIG. 21 illustrates an example of a second image IMG32 that is generated based on the first image IMG31 of FIG. 20.

Referring to FIGS. 18, 19, 20 and 21, in the method of measuring the thickness according to some example embodiments, an original image including image information of a structure having a plurality of layers is obtained (step S1100). As illustrated in FIG. 19, in the original image OIMG3, the hole structure may include a first layer 310, a second layer 320 inside the first layer 310, a third layer 330 inside the second layer 320, and a filling layer pattern 340 inside the third layer 330. A layer 305 may be formed outside the first layer 310. The hole structure may be represented in the original image OIMG3 based on rectangular coordinates with a horizontal axis direction X and a vertical axis direction Y.

The first layer 310 may include a first boundary BDA and a second boundary BDB, the second layer 320 may include the second boundary BDB and a third boundary BDC, and the third layer 330 may include the third boundary BDC and a fourth boundary BDD. As illustrated in FIG. 19, the first, second and third layers 310, 320 and 330 may include irregular and/or nonsmooth boundaries BDA, BDB, BDC and BDD. In the original image OIMG3, it may be relatively easy to detect the first boundary BDA, and it may be relatively difficult to detect the second, third and fourth boundaries BDB, BDC and BDD.

One of two boundaries of a first layer among the plurality of layers is extracted from the original image (step S1200). The step S1200 in FIG. 18 may be similar to the step S200 in FIG. 1. For example, a plurality of boundary points may be detected from the original image OIMG3 based on grayscale changes in the original image OIMG3, and the plurality of boundary points may be determined as the first boundary BDA.

The original image is converted into a first image based on the one of two boundaries of the first layer (step S1300). The step S1300 in FIG. 18 may be substantially the same as the step S300 in FIG. 1.

For example, as illustrated in FIGS. 20 and 21, the plurality of boundary points in the original image OIMG3 may be mapped into a plurality of axis points in the first image IMG31. The plurality of boundary points corresponding to the first boundary BDA may be nonlinearly arranged in the original image OIMG3, and the plurality of axis points corresponding to a fifth boundary BDA' may be linearly arranged in the first image IMG31. Partial images (e.g., pixel images) in a target region in the original image OIMG3 may be rearranged into partial images in the first image IMG31. By converting the original image OIMG3 into the first image IMG31, the first, second, third and fourth boundaries BDA, BDB, BDC and BDD, the first, second and third layers 310, 320 and 330 and the filling layer pattern 340 in the original image OIMG3 may be converted into the fifth, sixth, seventh and eighth boundaries BDA', BDB', BDC' and BDD', first, second and third layers 310a, 320a and 330a and a filling layer pattern 340a in the first image IMG31, respectively.

A second image is generated by performing a filtering operation on the first image (step S1400). The step S1400 in FIG. 18 may be substantially the same as the step S300 in FIG. 1. In addition, boundaries of layers among the plurality of layers other than the first layer are extracted from the second image (step S1500), and thicknesses of the plurality of layers are calculated based on the second image that includes the linearly rearranged boundary and the other extracted boundaries (step S1600). The steps S1500 and S1600 in FIG. 18 may be similar to the step S500 and S600 in FIG. 1, respectively.

For example, the first image IMG31 of FIG. 20 may be divided into the plurality of subregions. Each of the plurality of subregions may be averaged, e.g., based on a Gaussian filter. In addition, the noise may be selectively removed from the first image IMG31, e.g., based on a domain transform filter.

As illustrated in FIG. 21, the second image IMG32 may be finally obtained. By converting the first image IMG31 into the second image IMG32, the fifth, sixth, seventh and eighth boundaries BDA', BDB', BDC' and BDD', the first, second and third layers 310a, 320a and 330a and the filling layer pattern 340a in the first image IMG31 may be converted into the ninth, tenth, eleventh and twelfth boundaries BDA", BDB", BDC" and BDD", first, second and third layers 310b, 320b and 330b and a filling layer pattern 340b in the second image IMG32, respectively. In the second image IMG32, thicknesses of the first layer 310b may be calculated by measuring distances dA1, dA2, . . . , dAn between n points on the ninth boundary BDA" and n points on the tenth boundary BDB", thicknesses of the second layer 320b may be calculated by measuring distances dB1, dB2, . . . , dBn between n points on the tenth boundary BDB" and n points on the eleventh boundary BDC", and thicknesses of the third layer 330b may be calculated by measuring distances dC1, dC2, . . . , dCn between n points on the eleventh boundary BDC" and n points on the twelfth boundary BDD".

In some example embodiments, the hole structure may be represented in the first and second images IMG31 and IMG32 based on polar coordinates with an angle axis direction θ and a radius axis direction R.

Figure 22:
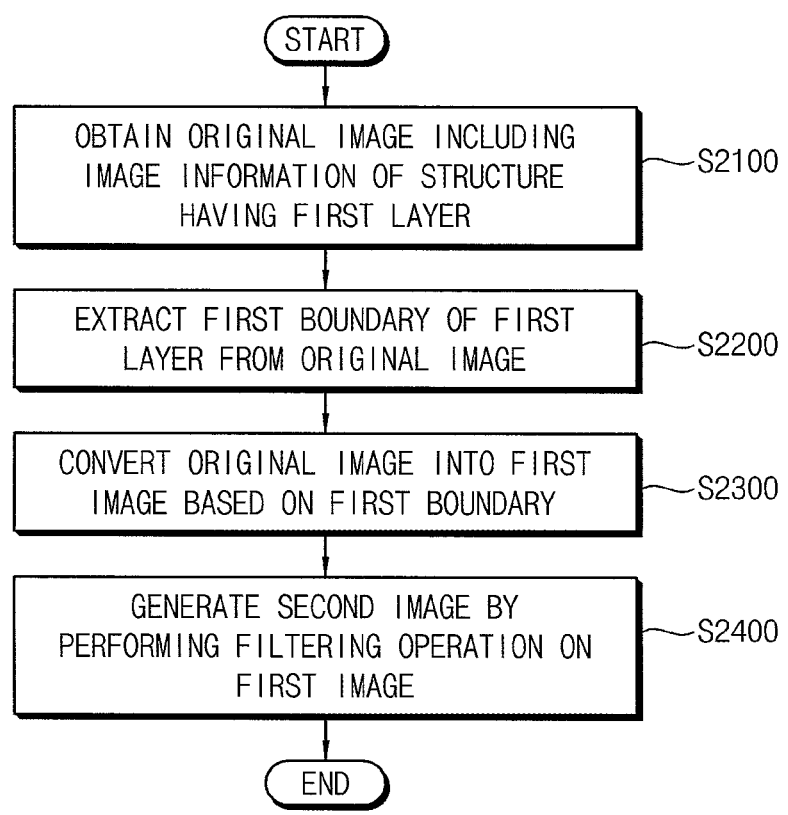
FIG. 22 is a flow chart illustrating a method of processing an image according to some example embodiments.

FIG. 22 is a flow chart illustrating a method of processing an image according to some example embodiments.

Referring to FIG. 22, in the method of processing the image according to some example embodiments, image processing may be performed on an image including an object or a layer, a thickness of which is to be measured.

In the method of processing the image according to some example embodiments, an original image including image information of a structure having a first layer is obtained (step S2100), a first boundary of the first layer is extracted from the original image (step S2200), the original image is converted into a first image based on the first boundary (step S2300), and a second image is generated by performing a filtering operation on the first image (step S2400) such that a second boundary of the first layer is extractable from the second image. The steps S2100, S2200, S2300 and S2400 in FIG. 22 may be substantially the same as the steps S100, S200, S300 and S400 in FIG. 1, respectively.

In some example embodiments, in the method of processing the image according to some example embodiments, an original image including image information of a structure having a plurality of layers may be obtained, a first boundary of a first layer among the plurality of layers may be extracted from the original image, the original image may be converted into a first image based on the first boundary, and a second image may be generated by performing the filtering operation on the first image such that boundaries of layers among the plurality of layers other than the first layer are extractable from the second image.

Figure 23:
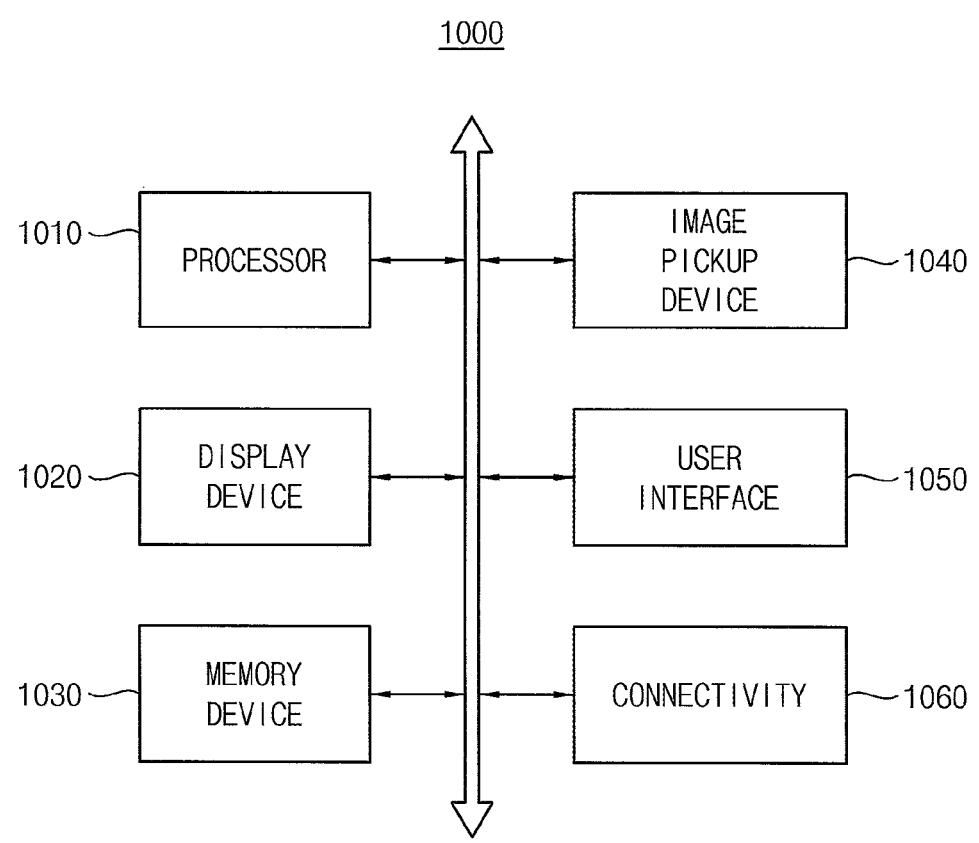
FIG. 23 is a block diagram illustrating an electronic system according to some example embodiments.

FIG. 23 is a block diagram illustrating an electronic system according to some example embodiments.

Referring to FIG. 23, an electronic system 1000 includes a processor 1010 and a display device 1020. The electronic system 1000 may further include a memory device 1030, an image pickup device 1040, a user interface 1050 and a connectivity 1060. Although not illustrated in FIG. 23, the electronic system 1000 may further include a graphic processor for image processing.

The processor 1010 may perform various computational functions such as particular calculations and tasks. For example, the processor 1010 may be a central processing unit (CPU), a microprocessor, an application processor (AP), etc. The processor 1010 may execute an operating system (OS) to drive the electronic system 1000, and may execute various applications for providing an internet browser, a game, a video, a camera, etc.

In some example embodiments, the processor 1010 may include a single processor core or multiple processor cores. In some example embodiments, the processor 1010 may further include a cache memory that is located inside or outside the processor 1010.

The display device 1020 may be one of various output devices, and may be controlled by the processor 1010. For example, the display device 1020 may be a liquid crystal display (LCD) device, a light emitting display (LED) device, an organic LED (OLED) device, a field emission display (FED) device, an inferometric modulator display (IMOD) device, etc.

The processor 1010 (or the graphic processor) may perform the method of measuring the thickness and/or the method of processing the image according to some example embodiments. The display device 1020 may display a result of the methods according to some example embodiments. For example, the processor 1010 may perform the method of processing the image according to some example embodiments by receiving an original image including image information of a structure having a first layer, by extracting a first boundary of the first layer from the original image, by converting the original image into a first image based on the first boundary, and by generating a second image by performing a filtering operation on the first image. In addition, the processor 1010 may perform the method of measuring the thickness according to some example embodiments by further extracting a second boundary of the first layer from the second image, and by further calculating a thickness of the first layer based on the first boundary and the second boundary. The display device 1020 may display the original image and the second image.

In some example embodiments, the processor 1010 may further calculate a uniformity of the thickness of the first layer, and the display device 1020 may further display a result of the calculation.

In some example embodiments, at least a portion of the methods according to some example embodiments may be performed by instructions (e.g., a software program) that are executed by the processor 1010 and are stored in the memory device 1030. In some example embodiments, at least a portion of the methods according to some example embodiments may be performed by hardware implemented in the processor 1010.

The memory device 1030 may operate as a data storage for data processed by the processor 1010 or a working memory. For example, the memory device 1030 may store a boot image for booting the electronic system 1000, a file system for the operating system to drive the electronic system 1000, a device driver for an external device connected to the electronic system 1000, and/or an application executed on the electronic system 1000. For example, the memory device 1030 may include a volatile memory such as a DRAM, a SRAM, a mobile DRAM, a double data rate (DDR) synchronous DRAM (SDRAM), a low power DDR (LPDDR) SDRAM, a graphic DDR (GDDR) SDRAM, or a Rambus DRAM (RDRAM), etc., and a non-volatile memory such as an electrically erasable programmable read-only memory (EEPROM), a flash memory, a phase change random access memory (PRAM), a resistance random access memory (RRAM), a magnetic random access memory (MRAM), a ferroelectric random access memory (FRAM), a nano floating gate memory (NFGM), or a polymer random access memory (PoRAM).

In some example embodiments, the memory device 1030 may store information including program routines of extracting the first boundary of the first layer from the original image, of converting the original image into the first image based on the first boundary, and of generating the second image by performing the filtering operation on the first image. The memory device 1030 may further store information including program routines of extracting the second boundary of the first layer from the second image, and of calculating the thickness of the first layer based on the first boundary and the second boundary, and may further store information including program routines of calculating the uniformity of the thickness of the first layer. The processor 1010 may control an execution of the program routines.

The image pickup device 1040 may be one of various input devices. The image pickup device 1040 may receive or obtain the original image, and may provide the original image to the processor 1010. In some example embodiments, the image pickup device 1040 may include the TEM. In some example embodiments, the image pickup device 1040 may include the SEM.

The user interface 1050 may include at least one input device such as a keypad, a button, a microphone, a touch screen, etc., and/or at least one output device such as a speaker, etc.

The connectivity 1060 may communicate with an external device. For example, the connectivity 1060 may communicate according to one of various types of protocols such as universal serial bus (USB), ethernet, near field communication (NFC), radio frequency identification (RFID), a mobile telecommunication like 4-generation (4G) and long term evolution (LTE), a memory card interface. For example, the connectivity 1060 may include a baseband chipset, and may support a communication such as GSM, GPRS, WCDMA, or HSxPA, etc.

In some example embodiment, the electronic system 1000 may be any computing system, such as a personal computer (PC), a server computer, a workstation, a tablet computer, a laptop computer, a mobile phone, a smart phone, a personal digital assistants (PDA), a portable multimedia player (PMP), a digital camera, a digital television, a set-top box, a music player, a portable game console, a navigation device, etc.

In some example embodiment, the electronic system 1000 may be any mobile system, such as a mobile phone, a smart phone, a tablet computer, a laptop computer, a PDA, a PMP, a digital camera, a portable game console, a music player, a camcorder, a video player, a navigation system, etc. The mobile system may further include a wearable device, an internet of things (IoT) device, an internet of everything (IoE) device, an e-book, etc.

According to some example embodiments, the electronic system 1000 and/or components of the electronic system 1000 may be packaged in various forms, such as a package on package (PoP), a ball grid arrays (BGA), a chip scale packages (CSP), a plastic leaded chip carrier (PLCC), a plastic dual in-line package (PDIP), a die in waffle pack, a die in wafer form, a chip on board (COB), a ceramic dual in-line package (CERDIP), a plastic metric quad flat pack (MQFP), a thin quad flat pack (TQFP), a small outline IC (SOIC), a shrink small outline package (SSOP), a thin small outline package (TSOP), a system in package (SIP), a multi chip package (MCP), a wafer-level fabricated package (WFP), or a wafer-level processed stack package (WSP).

As will be appreciated by those skilled in the art, the present disclosure may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device. For example, the computer readable medium may be a non-transitory computer readable medium.

The present disclosure may be used in any device, equipment or system for manufacturing the elements and/or the devices, such as an automated system that manufactures and/or analyze any element and/or device including at least one layer, a thickness of which is to be measured, thereby improving efficiency and quality and maximizing productivity and return-on-investment.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. A method of measuring a thickness, the method comprising:
    obtaining an original image of a structure, the structure including a first layer, the first layer including a first boundary and a second boundary, the original image including an image of the structure having the first layer, the second boundary being substantially indistinguishable in the original image;
    extracting the first boundary of the first layer in the original image;
    converting the original image into a first image based on the extracted first boundary;
    generating a second image, based on filtering the first image;
    extracting the second boundary of the first layer in the second image; and
    calculating a thickness of the first layer based on the extracted second boundary in the second image.

2. The method of claim 1, wherein extracting the first boundary of the first layer in the first image includes,
    detecting a plurality of boundary points in the original image based on grayscale value changes in the original image; and
    determining the first boundary as a line extending through the plurality of boundary points.

3. The method of claim 2, wherein detecting each boundary point in the original image based on grayscale changes in the original image includes determining that a difference between a grayscale value of a given boundary point and a grayscale value of a first point adjacent to the given boundary point is greater than a threshold grayscale value.

4. The method of claim 1, wherein converting the original image into the first image includes,
    identifying a target region in the original image based on the extracted first boundary in the original image, the target region being associated with the structure and the first layer;
    mapping a plurality of boundary points in the original image into a plurality of axis points in the first image, the plurality of boundary points corresponding to the first boundary in the original image; and
    obtaining the first image by changing arrangements of a plurality of partial images in the target region based on the plurality of axis points such that the plurality of axis points define a line extending substantially in parallel with an axis of the first image.

5. The method of claim 4, wherein,
    the plurality of boundary points are nonlinearly arranged in the original image,
    the plurality of axis points are linearly arranged in the first image, and a first linear line including the plurality of axis points is substantially parallel with a first direction, and
    the plurality of partial images are arranged in the first image along a second direction crossing the first direction.

6. The method of claim 5, wherein the plurality of boundary points are arranged with a circular shape or an elliptical shape in the original image.

7. The method of claim 4, wherein generating the second image includes,
    dividing the first image into a plurality of subregions; and
    performing an averaging operation on each of the plurality of subregions to generate a plurality of averaged subregions, such that the second image includes the plurality of averaged subregions.

8. The method of claim 7, wherein,
    the plurality of axis points are linearly arranged in the first image, and a first linear line including the plurality of axis points is parallel with a first direction,
    each of the plurality of subregions has a first side extending in the first direction and a second side extending in a second direction that is substantially perpendicular to the first direction, and
    the second side is shorter than the first side.

9. The method of claim 7, wherein the averaging operation is performed based on a Gaussian filter.

10. The method of claim 7, further comprising:
    removing noise from the first image to at least partially generate the second image.

11. The method of claim 10, further comprising:
    removing noise from the first image based on a domain transform filter.

12. The method of claim 1, wherein,
    the structure is represented in the original image based on rectangular coordinates, and
    the structure is represented in the first image and the second image based on polar coordinates.

13. An electronic system, comprising:
   an image pickup device configured to receive an original image of a structure, the structure including a first layer;
   a memory; and
   a processor interoperable with the memory to
      extract a first boundary of the first layer in the original image,
      convert the original image into a first image of the structure based on the extracted first boundary,
      generate a second image of the structure based on filtering the first image of the structure, and
      extract a second boundary of the first layer in the second image of the structure.

14. The electronic system of claim 13, wherein
   the processor is interoperable with the memory to extract the first boundary of the first layer based on
      detecting a plurality of boundary points in the original image based on grayscale changes in the original image, and
      identifying a line defined by the plurality of boundary points as the first boundary.

15. The electronic system of claim 14, wherein converting the original image into the first image includes,
   identifying a target region in the original image based on the first boundary such that the target region includes the plurality of boundary points, the target region including a plurality of partial images, and
   adjusting relative arrangements of the plurality of partial images to align the plurality of boundary points with an axis line.

16. The electronic system of claim 13, wherein generating the second image includes,
   dividing the first image into a plurality of subregions, and
   performing an averaging operation on pixel values of each of the plurality of subregions to generate a plurality of averaged subregions.

17. The electronic system of claim 13, wherein the processor is interoperable with the memory to calculate a thickness of the first layer based on the extracted first boundary and the extracted second boundary.

18. The electronic system of claim 17, wherein the processor is interoperable with the memory to calculate a uniformity of the thickness of the first layer.

19. A method, comprising:
   determining a thickness of a first layer of a structure based on processing an original image of the structure, the first layer including a first boundary and a second boundary, the original image including a representation of the first boundary, the second boundary being substantially indistinguishable in the original image, the determining including,
      segmenting the original image into a plurality of partial images, at least some of the partial images including separate portions of the first boundary representation;
      adjusting relative arrangements of the plurality of partial images to generate a first image of the structure, the first image including an aligned arrangement of the first boundary representation portions, the aligned arrangement being aligned with an axis line of the first image; and
      filtering the first image to generate a second image of the structure;
      extracting the second boundary from the second image; and
      determining the thickness of the first layer based on a determined distance between the first boundary and the second boundary.

20. The method of claim 19, wherein,
   the representation of the first boundary in the original image is a nonlinear line, and
   the axis line extends in a first direction in the first image.

* * * * *